United States Patent
Ni et al.

(10) Patent No.: US 11,878,602 B2
(45) Date of Patent: Jan. 23, 2024

(54) METHOD FOR ESTABLISHING ACTIVE DISTRIBUTION NETWORK PLANNING MODEL CONSIDERING LOCATION AND CAPACITY DETERMINATION OF ELECTRIC VEHICLE CHARGING STATION

(71) Applicants: State Grid Fujian Electric Power Co., Ltd., Fujian (CN); State Grid Fujian Economic Research Institute, Fujian (CN); Fujian Yirong Information Technology Co., Ltd., Fujian (CN)

(72) Inventors: Shiyuan Ni, Fujian (CN); Linyao Zhang, Fujian (CN); Jieyun Zheng, Fujian (CN); Tingting Lin, Fujian (CN); Pengjia Shi, Fujian (CN); Guilian Wu, Fujian (CN); Li Zhuang, Fujian (CN); Yi Liang, Fujian (CN); Xin Liu, Fujian (CN); Changzhui Lin, Fujian (CN)

(73) Assignees: State Grid Fujian Electric Power Co., Ltd., Fuzhou (CN); State Grid Fujian Economic Research Institute, Fuzhou (CN); Fujian Yirong Information Technology Co., Ltd., Fuzhou (CN)

( * ) Notice: Subject to any disclaimer, the term of this patent is extended or adjusted under 35 U.S.C. 154(b) by 569 days.

(21) Appl. No.: 17/124,576

(22) Filed: Dec. 17, 2020

(65) Prior Publication Data
US 2021/0155111 A1    May 27, 2021

Related U.S. Application Data

(63) Continuation-in-part of application No. PCT/CN2020/114922, filed on Sep. 12, 2020.

(30) Foreign Application Priority Data
Nov. 22, 2019   (CN) .......................... 201911161559.1

(51) Int. Cl.
H02J 13/00    (2006.01)
B60L 53/68    (2019.01)
(Continued)

(52) U.S. Cl.
CPC ............... *B60L 53/68* (2019.02); *B60L 53/63* (2019.02); *B60L 53/67* (2019.02); *G06F 30/18* (2020.01);
(Continued)

(58) Field of Classification Search
USPC .................. 320/106, 107, 108, 109, 110, 112
See application file for complete search history.

(56) References Cited

FOREIGN PATENT DOCUMENTS

| CN | 104463701 A | * | 3/2015 | ............. G06Q 50/06 |
| CN | 104463701 A | | 3/2015 | |

(Continued)

OTHER PUBLICATIONS

Xue Tian, EV Expressway Charging Station Layout Planning Based on MOEA/D Algorithm, A thesis submitted for Master Degree in Logistics Engineering at Shandong University, Apr. 20, 2019, pp. 11-22.

*Primary Examiner* — Brian Ngo

(57) ABSTRACT

Disclosed is a method for establishing an active distribution network planning model considering location and capacity determination of an electric vehicle charging station. In terms of location and capacity determination of electric vehicle charging stations, a traffic flow of electric vehicles is converted into a charging demand flowing in a traffic network, and an electric vehicle traffic network model is established based on an M/M/s queuing model and a flow capturing location model in the traffic field. A distributed generation (including wind power and photovoltaic) and load model is established, based on a time series method. An energy storage element model in a power distribution net- (Continued)

work is established based on an idea of equivalent load. A nested planning model is established by taking economy and reliability of a power distribution network and a maximum traffic flow intercepted by the electric vehicle charging stations as objectives.

3 Claims, 7 Drawing Sheets

(51) Int. Cl.
*B60L 53/63* (2019.01)
*B60L 53/67* (2019.01)
*G06F 30/18* (2020.01)

(52) U.S. Cl.
CPC ..... *H02J 13/00002* (2020.01); *B60L 2240/72* (2013.01); *H02J 2203/20* (2020.01)

(56) References Cited

FOREIGN PATENT DOCUMENTS

| | | | | |
|---|---|---|---|---|
| CN | 105389621 A | * | 3/2016 | |
| CN | 105809278 A | * | 7/2016 | |
| CN | 106532686 A | | 3/2017 | |
| CN | 106845727 A | * | 6/2017 | |
| CN | 109193727 A | * | 1/2019 | ................ H02J 3/32 |
| CN | 109398149 A | * | 3/2019 | ................ H02J 3/32 |
| CN | 110458329 A | | 11/2019 | |

* cited by examiner

METHOD FOR ESTABLISHING ACTIVE DISTRIBUTION NETWORK PLANNING MODEL CONSIDERING LOCATION AND CAPACITY DETERMINATION OF ELECTRIC VEHICLE CHARGING STATION

CROSS-REFERENCE TO RELATED APPLICATIONS

The present application is a Continuation-in-part Application of PCT application No. PCT/CN2020/114922 filed on Sep. 12, 2020, which claims the benefit of Chinese Patent Application No. 201911161559.1 filed on Nov. 22, 2019, the contents of which are hereby incorporated by reference.

FIELD

The present disclosure relates to the field of power grid technologies, and more particular, to a method for establishing an active distribution network planning model considering location and capacity determination of an electric vehicle charging station.

BACKGROUND

With the access of distributed generation (DG) and electric vehicles (EVs), power planning content of a power distribution network becomes more complex, and more factors need to be considered in terms of access costs and comprehensive benefits. On the one hand, DG output and load demands have significantly different time-series characteristics. Reasonable access to an energy storage device can store energy in electricity troughs and release energy in electricity peaks, so as to achieve the complementation between DG and load demands and reduce comprehensive costs of a planning scheme. On the other hand, access to EV charging stations may lead to charging load, and a location and capacity determination problem may also affect the stability of the power distribution network and the convenience of EV travel. Therefore, it is of great significance for an active distribution network to establish an effective planning model including wind-solar storage and charging stations.

SUMMARY

In view of this, an objective of the present disclosure is to provide a method for establishing an active distribution network planning model considering location and capacity determination of an electric vehicle charging station, which can consider mutual influences between a power network and a traffic network at the same time, and make distribution network planning results more suitable to the energy development trend under a new situation on the premise of satisfying multi-load demands.

The present disclosure is implemented using the following solution: a method for establishing an active distribution network planning model considering location and capacity determination of an electric vehicle charging station is provided, including the following steps:

step S1: establishing a traffic network, and establishing, based on an M/M/s queuing model and a flow capturing location model, a traffic network including an electric vehicle charging station;

step S2: establishing an active distribution network model, and establishing a distributed generation and load time-series model based on a time-series method; and establishing an energy storage model based on an equivalent load principle; and step S3: converting a traffic flow of electric vehicles into an equivalent load of an equivalent charging station, coupling the traffic network with a power grid, and establishing an active distribution network nested planning model considering the traffic network.

Further, step S1 particularly includes:
step S11: calculating an EV charging capacity demand;
calculating an EV charging capacity demand;
calculating a battery pack quantity demand;

$$N_B = \sum_{i=1}^{5} \left( N_{EVi} \frac{L_{di}}{L_{0i}} a_i b_i K_{EVdi} \right) \quad (1)$$

in the formula: $N_B$ is a daily demand for battery packs; $N_{EVi}$ is a stock of an $i^{th}$-type EV; $L_{di}$ and $L_{0i}$ are respectively an average daily mileage of the $i^{th}$-type EV and a distance at which the $i^{th}$-type EV travels on a full charge; and $a_i$, $b_i$, and $K_{EVdi}$ are respectively attendance rates, a battery replacement ratio, and the number of battery packs per vehicle for the $i^{th}$-type EV;
the charging capacity demand is:

$$W_B = N_B P_C t_{charge}/(\eta_{tran}\eta_{charge}) \quad (2)$$

in the formula: $\eta_{tran}$ is transformer efficiency; $\eta_{charge}$ is charger efficiency; $P_c$ denotes an average charge power; and $t_{charge}$ denotes a charging time;

step S12: establishing a charging station location and capacity determination model;

calculating a traffic flow $F_{CS}$ annually intercepted by a system-wide charging station by using a gravity space interaction model in combination with a Floyd algorithm; of which a calculation formula is as follows: and calculating a traffic flow intercepted by a single charging station according to the following formulas:

$$f_{k,t}^{road} = \frac{\omega_{ko}\omega_{kd}}{D_k^{1.5}} \cdot \frac{\sigma_t}{\sigma_{RH}}, k \in \Omega_{od}, t \in T \quad (3)$$

$$F_{CS} = 365 \cdot \sum_{t=1}^{24} \sum_{k \in \Omega_{bd}} f_{k,t}^{road} x_k^{load} \quad (4)$$

in the formula (3): $f_{k,t}^{road}$ denotes a per-unit value of a one-way traffic flow demand of the shortest path k in a period t; $\omega_{ko}$ and $\omega_{kd}$ are traffic demand weights of a starting point and an ending point of the path k respectively, used to indicate busyness degrees of traffic nodes; $D_k$ is a per-unit value of the length of the path k; $\sigma_t$ and $\sigma_{RH}$ are travel ratios of EV users in a period t and a peak hour h respectively; $\Omega_{bd}$ is a set of shortest paths from any starting point o to any ending point d in the traffic network and is obtained according to the Floyd algorithm; T is a set of periods; and $x_k^{load}$ indicates a binary variable of whether a flow on the path k can be intercepted by a charging station, if the path k passes through the charging station, the variable is 1, and otherwise, the variable is 0;

calculating an equivalent charging load according to the traffic flow intercepted by the single charging station in the following calculation manners:

$$f_{i,t}^{CS} = \sum_{k\in\Omega_{od}} f_{k,t}^{road} x_{k,i}^{road} x_i^{CS}, \ i\in\Omega, t\in T \tag{5}$$

$$\lambda_i^{RH} = \max\left\{\lambda_{i,t} \mid \lambda_{i,t} = \tilde{F}^{CS} \frac{\sigma_t}{\sum_{t\in T}\sigma_t} \cdot \frac{f_{i,t}^{CS}}{\sum_{i\in\Omega} f_{i,t}^{CS}}\right\}, \ i\in\Omega \tag{6}$$

$$P_{i,t}^{CS} = p^{CS}\frac{\lambda_{i,t}}{\mu}, \ i\in\Omega, t\in T \tag{7}$$

in the formula (5), $f_{i,t}^{CS}$ is a traffic flow intercepted by a node i in a period t; $x_{k,i}^{road}$ is a binary variable of whether the path k passes through the node i; $x_i^{CS}$ is a binary variable of whether a charging station is constructed at the node i; $\Omega$ is a set of network nodes; $\lambda_{i,t}$ is the number of electric vehicles arriving at the charging station located at the node i at time t to receive a charging service; in the formula (6), $P_{i,t}^{CS}$ is a charge power of the node i at the time t; $\lambda_i^{RH}$ is an average arrival rate of to-be-charged vehicles at the node i during rush hours, i.e. the number of EVs arriving at the charging station to receive the charging service per unit of time; $\tilde{F}^{CS}$ is a total daily charging frequency demand of an EV charging station and needs to be calculated according to $W_B$ in the formula (2); $\tilde{F}^{CS}=W_B$/preset maximum battery pack capacity; $W_B$ is a charging capacity; in the formula (7), $p^{CS}$ is a charge power of a single charging device; and $\mu$ is an average service rate of a single device, in units of vehicles per hour; and step S13: transforming, based on the/M/s queuing model, a capacity determination problem of a charging station into the following nonlinear integer planning problems:

$$\min z_i^{CS} \tag{8}$$

$$\text{s.t.}\begin{cases} W_i^{RH} < W^{allowed} \\ z_i^{CS} \geq \dfrac{\lambda_i^{RH}}{\mu} \end{cases}, \forall i\in\Omega \tag{9}$$

$$W_i^{RH} = P_i^{non}\frac{(z_i^{CS}\rho_i^{RH})^{z_i^{CS}}\rho_i^{RH}}{\lambda_i^{RH}(z_i^{CS})!(1-\rho_i^{RH})^2}, \ \lambda_i^{RH} \neq 0 \tag{10}$$

$$P_i^{non} = \left[\sum_{n=0}^{z_i^{CS}-1}\frac{(z_i^{CS}\rho_i^{RH})^n}{n!} + \frac{(z_i^{CS}\rho_i^{RH})^{z_i^{CS}}}{(z_i^{CS})!(1-\rho_i^{RH})}\right]^{-1} \tag{11}$$

$$\rho_i^{RH} = \frac{\lambda_i^{RH}}{z_i^{CS}\mu} \tag{12}$$

in the formulas: $z_i^{CS}$ is the number of charging devices configured for the node i, which is multiplied by $p^{CS}$ to obtain the capacity of the charging station at node $W_i^{RH}$ and $W^{allowed}$ are an average waiting time for receiving a charging service during rush hours and a threshold thereof respectively; $P_i^{non}$ is the probability that charging station devices at the node i are all idle; and $\rho_i^{RH}$ is an average device usage rate of the node i during rush hours.

Further, step S2 particularly includes:
establishing the active distribution network model, and sampling, based on a time series method, typical output and different types of typical load curves of distributed generation including wind power and photovoltaic, to obtain a DG output value $P_{DGi}(t)$ and a load value $P_{Li}(t)$ of the node i at the time t; and establishing an energy storage model based on an equivalent load principle, an energy storage element adjusting strategy being as follows:

calculating an equivalent load $P_{eqi}$ and an average equivalent load $P_{avi}$ of the node i at the time t, $$P_{eqi}(t) = P_{Li}(t) - P_{DGi}(t) \tag{13}$$

$$P_{avi} = \sum_{t=1}^{24} P_{eqi}(t)/24 \tag{14}$$

in the formulas: $P_{Li}(t)$ and $P_{DGi}(t)$ represent a load value and a DG output value of the node i at the time t; and the energy storage element adjusting strategy is particularly as follows:

when $P_{eqi}(t)+\Delta P_1 \ll P_{avi}$, an accumulator is charged, and $\Delta P_1$ is a charge power;

if $|P_{eqi}(t)+\Delta P_1-P_{avi}| \leq \delta P_{avi}$ is met, the accumulator is charged; $\delta$ represents a fluctuation coefficient of $P_{eqi}$ around a mean value thereof;

when $P_{eqi}(t)-\Delta P_2 \gg P_{avi}$, the accumulator is discharged, and $\Delta P_2$ is a discharge power; and if $|P_{eqi}(t)-\Delta P-P_{avi}| \leq \delta P_{avi}$ is met, the accumulator is discharged.

Further, step S3 particularly includes:
an objective function of the nested planning model being:

$$\min\begin{cases} f_1 = \dfrac{r(1+r)^\eta}{(1+r)^\eta - 1}C^{inv} + C^{ope} \\ f_2 = \sum_{s=1}^{96}\sum_{i=1}^{n} U_{s,i}^{level}/(96\cdot n), \ i\in\Omega, s\in\Omega_s \\ f_3 = 1/\left(365\cdot\sum_{t=1}^{24}\sum_{k\in\Omega_{od}} f_{k,t}^{road} x_k^{load}\right), \ t\in T \end{cases} \tag{15}$$

$$C^{inv} = p^{DG}\left(c_1^{PV}\sum_{j\in\Omega^{PV}} N_j + c_1^{WG}\sum_{k\in\Omega^{WG}} N_j\right) + \\ c^{CS}\sum_{i\in\Omega} z_i^{CS} x_i^{CS} + \sum_{k\in\Omega^{BS}} x_k^{BS}(c_1^{BS} S_{max}^{BS} + c_2^{BS} P_{max}^{BS}) \tag{16}$$

$$C^{ope} = \\ c_2^{PV}\sum_{s\in\Omega_s}\sum_{j\in\Omega^{PV}}\Delta t_s P_{s,j}^{PV} + c_2^{WG}\sum_{s\in\Omega_s}\sum_{j\in\Omega^{WG}}\Delta t_s P_{s,j}^{WG} + \sum_{s\in\Omega_s} f_e(s) P_{em}(s)\Delta t_s \tag{17}$$

$$P_{em}(s) = \sum_{i=1}^{n}(P_{s,i}^L + P_{s,i}^{CS}) - \left(\sum_{j\in\Omega^{PV}} P_{s,j}^{PV} + \sum_{j\in\Omega^{WG}} P_{s,j}^{WG}\right) + P_s^{loss} \tag{18}$$

$$U_{s,i}^{level} = \begin{cases} \dfrac{V_{s,i}-1}{V^{min}-1}, V^{min} < V_{s,i} \leq 1 \\ \dfrac{V_{s,i}-1}{V^{max}-1}, 1 < V_{s,i} < V^{max} \\ 1.0, \ V_{s,i} \geq V^{max}; V_{s,i} \leq V^{min} \end{cases} \tag{19}$$

in the formulas: $f_1$ denotes an economic cost, including a construction cost $C^{inv}$ and an operation cost $C^{ope}$; r is a discount rate; $\eta$ is an investment life; $f_2$ denotes a voltage quality index; $U_{s,i}^{level}$ is a voltage quality evaluation function value of the node i in a scenario s; n is the total number of network nodes; $\Omega$ denotes a set of nodes; $\Omega_s$ is a set of scenarios; $f_3$ denotes a traffic network satisfaction index; $\Omega_{od}$ is a set of shortest paths from any starting point o to any ending point d in the traffic network; $f_{k,t}^{road}$ denotes a per-unit value of a one-way traffic flow demand of the shortest path k in a period t; $x_k^{load}$ denotes a binary variable of whether a flow on the path k is interrupted by a charging state; T is a set of periods; $P^{DG}$ is a DG unit capacity; $x_i^{CS}$ is a binary variable of whether a charging station is constructed at the node i; $c_1^{PV}$ and $c_1^{WG}$ are investment costs per unit capacity of photovoltaic and wind power generation respectively; $\Omega^{PV}$ and $\Omega^{WG}$ are sets of nodes for mounting photovoltaic and fans; $N_j$ is the number of DGs of the $j^{th}$ mounting node; $c^{cs}$ is investment cost of each charging device; $x_k^{BS}$ is a binary variable of whether a node k is put into an energy storage device; $\Omega^{BS}$ is a set of nodes for mounting energy storage; $c_1^{BS}$ and $c_2^{BS}$ are a unit capacity cost and a charge-discharge power cost of the energy storage device respectively; $S_{max}^{BS}$ and $P_{max}^{BS}$ maximum energy storage capacity and maximum charge-discharge power respectively; $c_2^{PV}$ and $c_2^{WG}$ are unit operation costs of photovoltaic and wind power generation respectively; $\Delta t_s$ is an annual cumulative operation time of a distribution network in a scenario s; $P_{s,j}^{PV}$ and $P_{s,j}^{WG}$ are outputs of the $j^{th}$ PV or WG in the scenario s; $f_e(s)$ and $P_{em}(s)$ are electricity price and electric power demands in the scenario s respectively; $P_{s,i}^{L}$ and $P_{s,i}^{CS}$ are a load power and an EV charge power of the node i in the scenario s; $P_s^{loss}$ is electric energy loss in the scenario s; $V_{s,i}$ is a voltage amplitude of the node i in the scenario s; and $V^{min}$ and $V^{max}$ are an allowable lower limit and an allowable upper limit of a node voltage respectively; constraints of the nested planning model including traffic network constraints and power grid constraints, and the traffic network constraints being as follows:

$$\begin{cases} W_i^{RH} < W^{allowed} \\ z_i^{CS} \geq \dfrac{\lambda_i^{RH}}{\mu} \end{cases}, \forall i \in \Omega \quad (20)$$

$$\sum_{i \in \Omega} x_i^{CS} \leq N^{CS} \quad (21)$$

$$\sum_{i \in \Omega} \sum_{k \in \Omega_{od}} f_{k,t}^{road} x_{k,i}^{road} x_i^{CS} \geq \sum_{k \in \Omega_{od}} f_{k,t}^{road}, \forall t \in T \quad (22)$$

$$W_i^{RH} = P_i^{non} \dfrac{(z_i^{CS} \rho_i^{RH})^{z_i^{CS}} \rho_i^{RH}}{\lambda_i^{RH}(z_i^{CS})!(1-\rho_i^{RH})^2}, \lambda_i^{RH} \neq 0 \quad (23)$$

$$P_i^{non} = \left[\sum_{n=0}^{z_i^{CS}-1} \dfrac{(z_i^{CS} \rho_i^{RH})^n}{n!} + \dfrac{(z_i^{CS} \rho_i^{RH})^{z_i^{CS}}}{(z_i^{CS})!(1-\rho_i^{RH})}\right]^{-1} \quad (24)$$

$$\rho_i^{RH} = \dfrac{\lambda_i^{RH}}{z_i^{CS}\mu} \quad (25)$$

in the formulas: $z_i^{CS}$ is the number of charging devices configured for the node i, which is multiplied by $p^{CS}$ to obtain a charge power of a single charging device at the node i; $\lambda_i^{RH}$ is an average arrival rate of to-be-charged vehicles at the node i during rush hours, i.e. the number of road EVs arriving at the charging station to receive the charging service per unit of time; $x_{k,i}^{road}$ denotes a binary variable of whether a flow on the path k can be intercepted by a charging station; $\Omega_{bd}$ is a set of shortest paths from any starting point o to any ending point d in the traffic network; $W_i^{RH}$ and $W^{allowed}$ are an average waiting time for receiving a charging service during rush hours and a threshold thereof respectively; $P_i^{non}$ is the probability that charging station devices at the node i are all idle; $\rho_i^{RH}$ is an average device usage rate of the node i during rush hours; $N^{CS}$ is the maximum number of charging stations to be constructed; and μ is an average service rate of a single device;

the power grid constraints being as follows:
power flow constraints of the power distribution network:

$$\begin{cases} P_{s,i}^L + P_{s,i}^{CS} - P_{s,i}^{DG} = V_{s,i} \sum_{j=1}^{n} V_{s,j}(G_{ij}\cos\delta_{s,ij} + B_{ij}\sin\delta_{s,ij}) \\ Q_{s,i}^L - Q_{s,i}^{DG} = V_{s,i} \sum_{j=1}^{n} V_{s,j}(G_{ij}\sin\delta_{s,ij} - B_{ij}\cos\delta_{s,ij}) \end{cases} \forall s \in \Omega_s, \quad (26)$$

$$i \in \Omega$$

scenario chance constraints:

$$Pr\{V^{min} \leq V_{s,i} \leq V^{max}, |P_{s,ij}| \leq P_{ij}^{max}\} = \dfrac{K_s}{96} \geq \gamma \forall i \in \Omega, \forall ij \in \Omega^{Line} \quad (27)$$

DG mounting capacity constraints:

$$\begin{cases} 0 \leq P_{s,j}^{PV} \leq \overline{P}_{s,j}^{PV}, \forall s \in \Omega_s, j \in \Omega^{PV} \\ 0 \leq P_{s,j}^{WG} \leq \overline{P}_{s,j}^{WG}, \forall s \in \Omega_s, j \in \Omega^{WG} \\ \sum_{s \in \Omega_s}(P_{s,j}^{PV} + P_{s,j}^{WG}) \leq \varepsilon \sum_{s \in \Omega_s}\sum_{i=1}^{n} P_{s,i}^L \end{cases} \quad (28)$$

energy storage capacity and charge-discharge power constraints:

$$\begin{cases} 0 \leq S_k^{BS} \leq S_{max}^{BS}, \\ 0 \leq P_k^{BS} \leq P_{max}^{BS}, \end{cases} \forall k \in \Omega^{BS} \quad (29)$$

in the formulas: $Q_{s,i}^L$ is a reactive load of the node i in the scenario s; $P_{s,i}^{DG}$ and $Q_{s,i}^{DG}$ are DG active and reactive outputs of the node i in the scenario s; $V_{s,j}$ is a voltage amplitude of a node j in the scenario s; $G_{ij}$ and $B_{ij}$ are real part and imaginary part of network admittances respectively; $\delta_{s,ij}$ is a voltage phase angle difference of the nodes i and j in the scenario s; $P_{s,ij}$ and $P_{ij}^{max}$ are a power flowing through a line ij and a power limit; $K_s$ is the number of scenarios meeting chance constraints; γ is a confidence coefficient; $\Omega^{Line}$ is a set of power distribution network lines; $P_{s,j}^{PV}$ and $P_{s,j}^{WG}$ are output upper limits of PV and WG respectively; ε is a maximum penetration rate of DG access; and $S_k^{BS}$ and $P_k^{BS}$ area current device capacity and a charge-discharge power of an energy storage node k respectively.

Compared with the prior art, the present disclosure has the following beneficial effects:
1. The present disclosure can reduce construction costs of electric vehicle charging stations to the greatest extent and reduce planning costs of a power distribution network.

2. Voltage stability is one of the planning objectives of the present disclosure. Therefore, the present disclosure can reduce a voltage fluctuation degree of the power distribution network to the greatest extent and make voltage distribution of the power distribution network more uniform.

3. The present disclosure combines an electric vehicle network into a power network, fully considers influences of electric vehicle charging on the power distribution network, and formulates an optimal optimized dispatching strategy of a power grid in combination with the electric vehicle charging, which has very significant practical significance for optimized dispatching of electric vehicles connected to the power distribution network.

DETAILED DESCRIPTION

Figure 1:
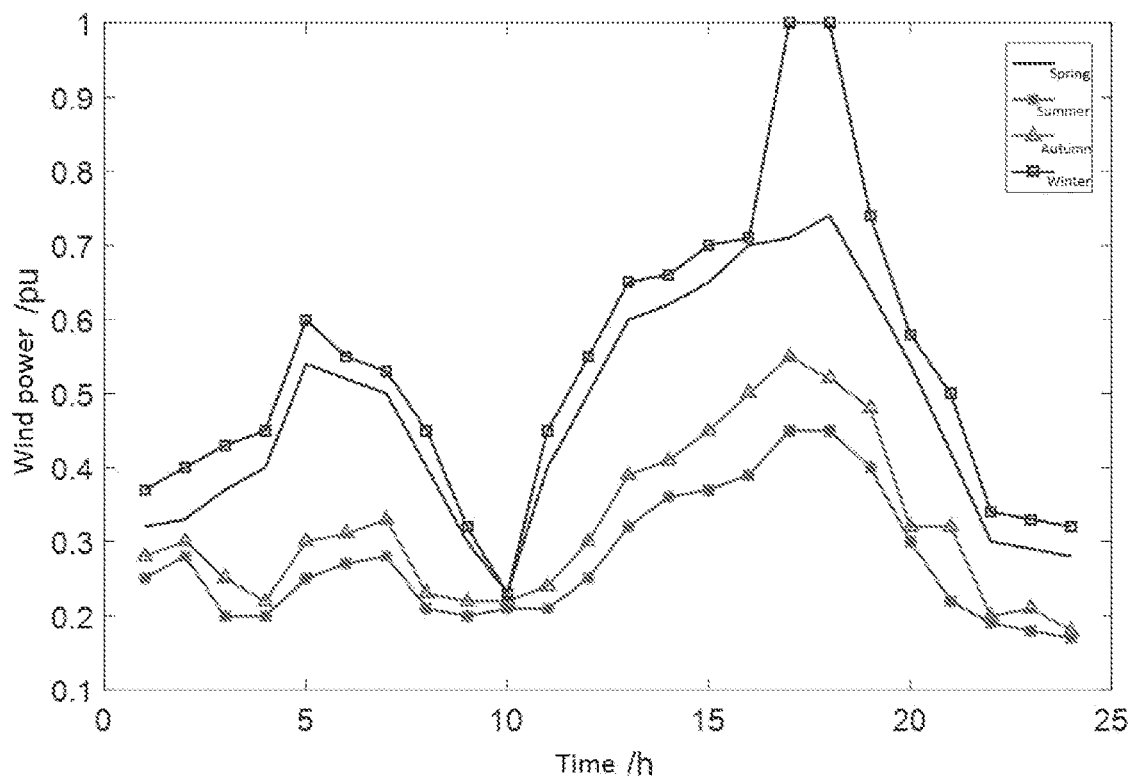
FIG. 1 is an output power diagram of wind power generation according to an embodiment of the present disclosure.
Figure 2:
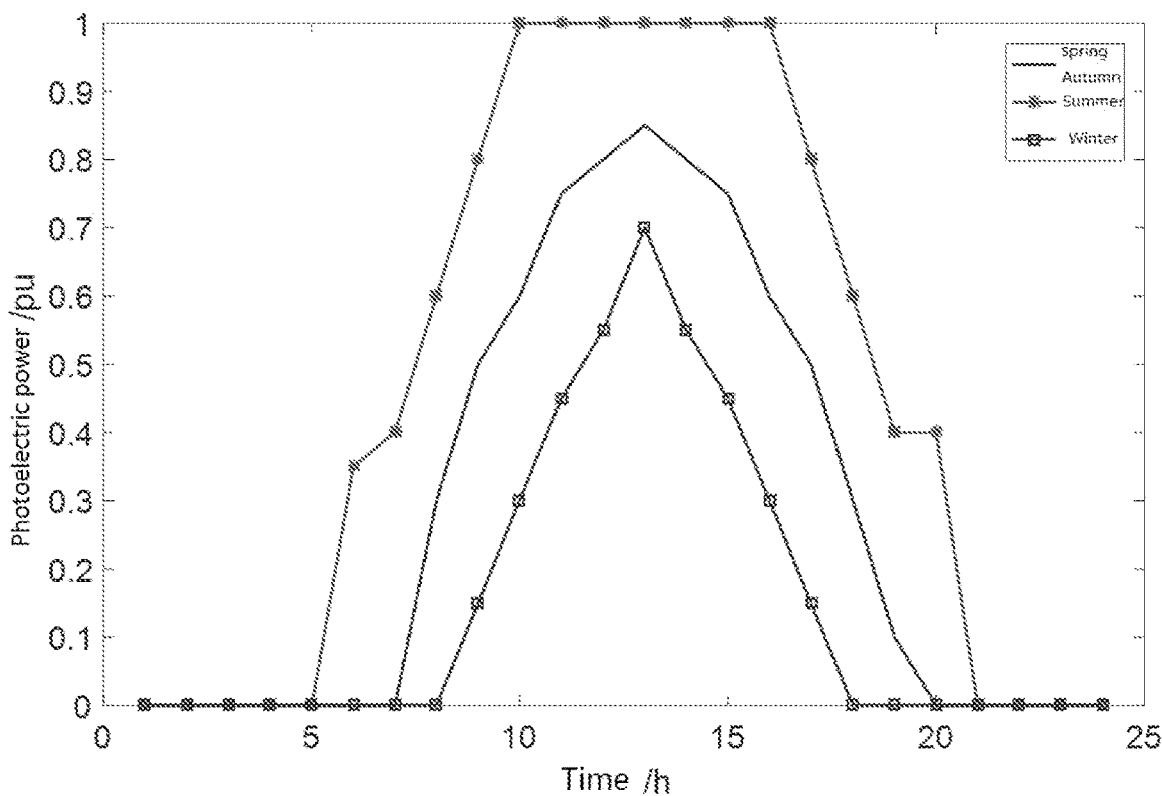
FIG. 2 is an output power diagram of photovoltaic power generation according to an embodiment of the present disclosure.
Figure 3:
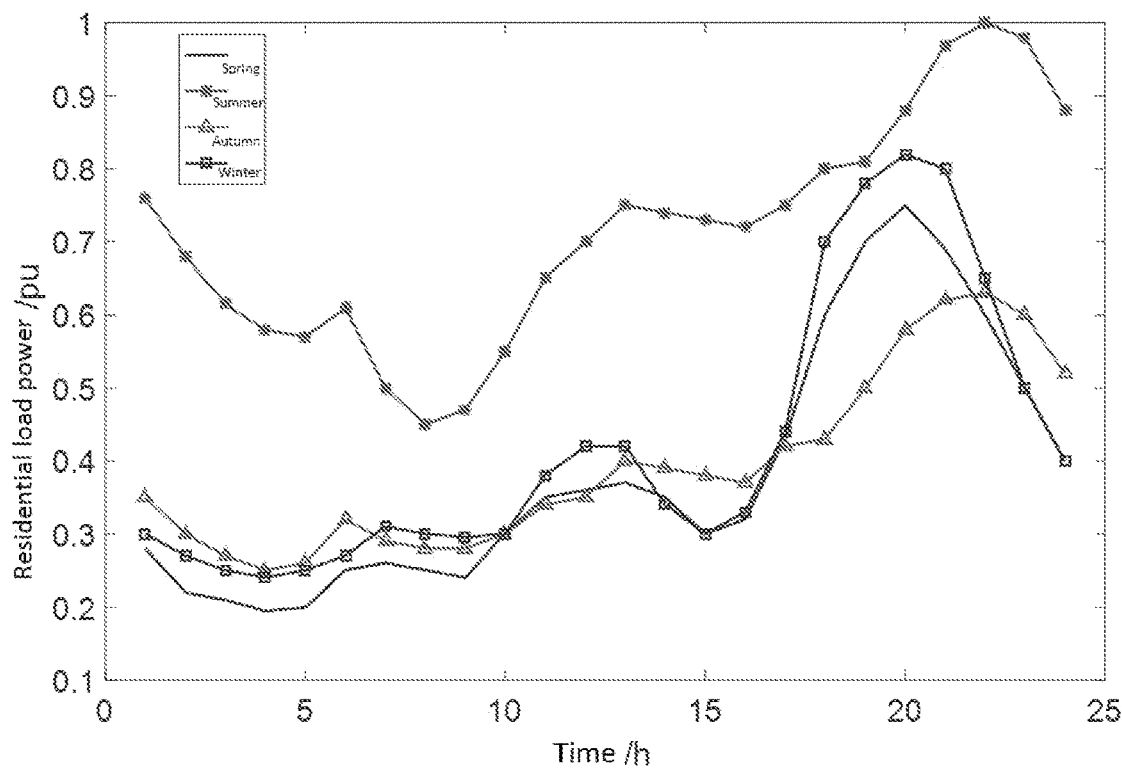
FIG. 3 is a residential load power diagram according to an embodiment of the present disclosure.
Figure 4:
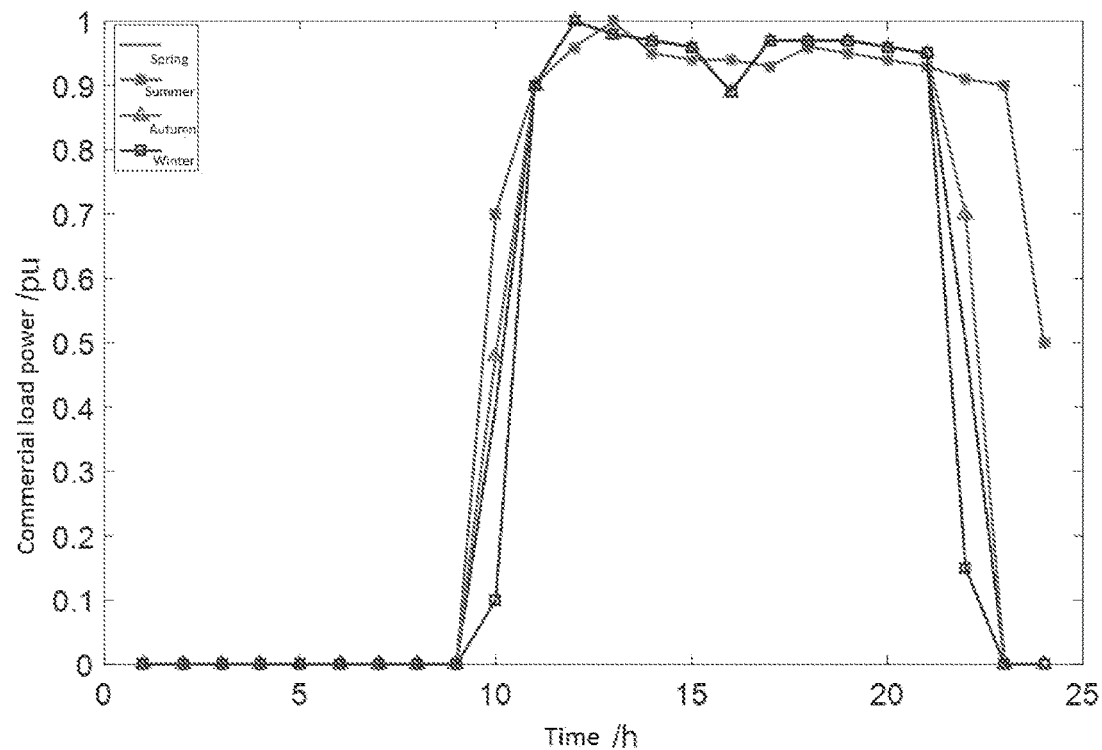
FIG. 4 is a commercial load power diagram according to an embodiment of the present disclosure.
Figure 5:
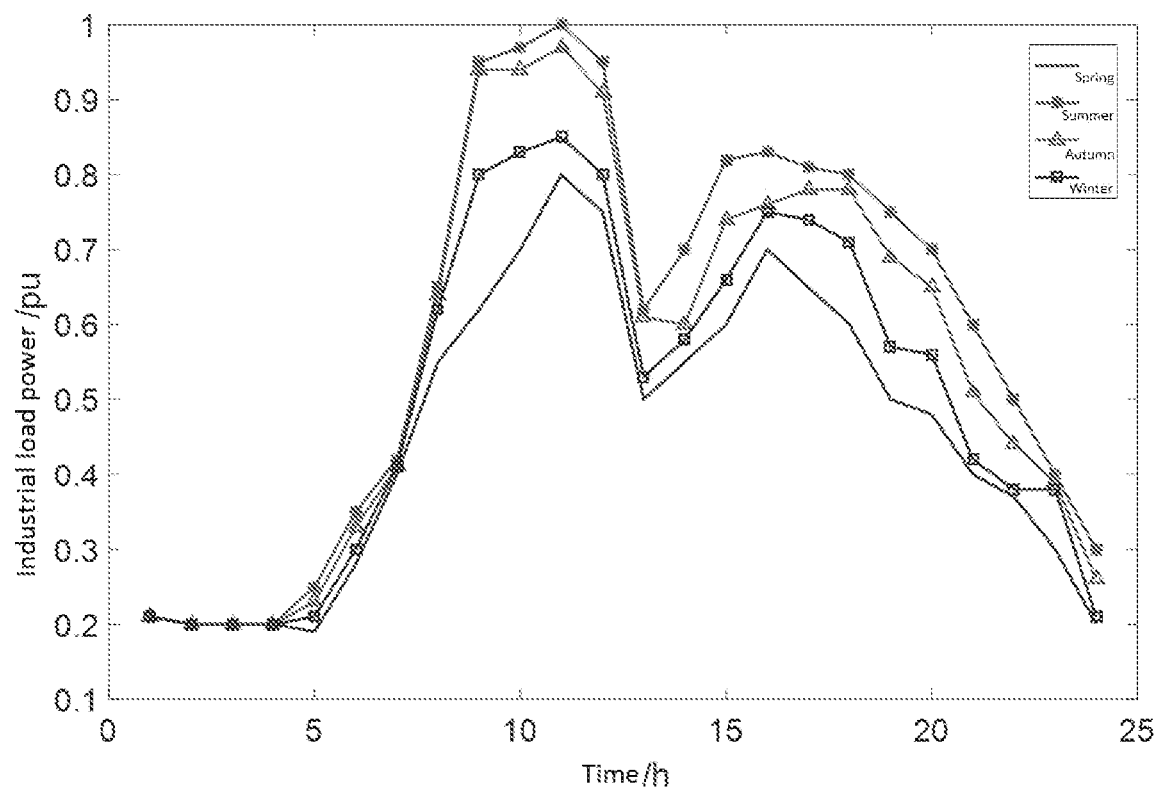
FIG. 5 is an industrial load power diagram according to an embodiment of the present disclosure.

The present disclosure is further described below with reference to the accompanying drawings and embodiments.

It should be noted that the following detailed descriptions are all illustrative and are intended to provide further clarification of this application. Unless otherwise specified, all technical and scientific terms used herein have the same meanings as normally understood by a person of ordinary skill in the art.

It is important to note that the terms used herein are intended only to describe specific implementations and are not intended to limit exemplary implementations according to this application. As used herein, the singular forms "a", "an" and "the" are intended to include the plural forms as well, unless the context clearly indicates otherwise. In addition, it should also be understood that when the terms "include" and/or "comprise" are used in this specification, they indicate the presence of features, steps, operations, devices, components and/or their combinations.

This embodiment provides a method for establishing an active distribution network planning model considering location and capacity determination of an electric vehicle charging station, which couples a power network to a traffic network, and implements location and capacity determination of an electric vehicle charging station by converting a traffic flow of electric vehicles in the traffic network into an electric load required by electric vehicle charging while considering device elements such as wind-solar storage in the active distribution network. The method includes the following steps:

Step S1: Establish a traffic network, and establish, based on an M/M/s queuing model and a flow capturing location model in a traffic field, a traffic network including an electric vehicle charging station.

Step S2: Establish an active distribution network model, and establish a distributed generation (including wind power and photovoltaic) and load time-series model based on a time-series method; and establish an energy storage model based on an equivalent load principle.

Step S3: Convert a traffic flow of electric vehicles into an equivalent load of an equivalent charging station, couple the traffic network with a power grid, and establish an active distribution network nested planning model considering the traffic network.

In this embodiment, a location and capacity determination model includes an MMs queuing model and a flow capturing location model, and step S particularly includes the following steps:

Step S11: Calculate an EV charging capacity demand.

Calculate a battery pack quantity demand:

An EV is typically powered by several battery packs, each of which consists of a number of cells in series and in paralle[12]. Therefore, an EV charging demand can be analyzed with such an intermediate variable as a battery pack quantity demand.

According to different uses, EVs can be classified as buses, service cars, taxis, private cars, and other vehicles (sanitation vehicles, postal vehicles, etc.). The quantity demand of battery packs is mainly related to information such as a stock of EVs, a daily driving distance, an attendance rate, and a battery replacement ratio of each vehicle model. Therefore, the quantity demand of battery packs is calculated herein, as shown in the formula (1).

$$N_B = \sum_{i=1}^{5} \left( N_{EVi} \frac{L_{di}}{L_{0i}} a_i b_i K_{EVdi} \right) \quad (1)$$

in the formula: $N_B$ is a daily demand for battery packs; $N_{EVi}$ is a stock of an $i^{th}$-type EV; $L_{di}$ and $L_{0i}$ are respectively an average daily mileage of the $i^{th}$-type EV and a distance at which the $i^t$-type EV travels on a full charge; and $a_i$, $b_i$, and $K_{EVdi}$ are respectively attendance rates, a battery replacement ratio, and the number of battery packs per vehicle for the $i^{th}$-type EV.

In this embodiment, it is assumed that the EVs adopt unified lithium-ion battery packs, each consisting of 15 single cells (of which the rated voltage is 3.65 V and the rated capacity is 6 A·h) in series. In this embodiment, it is deemed that a charging process thereof may be approximately constant power charging, and a charge power $P_C$ of a single battery pack is approximately 1660 W, and a required duration $t_{charge}$ is 2.5 h. On the other hand, an EV charging station is equipped with a large number of charging devices, and a set of devices consist of a transformer and several charging mechanisms attached to it. For the convenience of analysis, assuming that the charging station performs electricity distribution according to a maximum demand of an EV battery pack, the charging capacity demand at this time is:

$$W_B = N_B P_c t_{charge}/(\eta_{tran}\eta_{charge}) \quad (2)$$

in the formula: $\eta_{tran}$ is transformer efficiency; $\eta_{charge}$ charger efficiency; $P_c$ denotes an average charge power; and $t_{charge}$ denotes a charging time.

Step S12: Establish a charging station location and capacity determination model.

In the traffic network, the charging station needs to cover a traffic flow in the network, and the location problem usually needs to consider intercepting as much flow as possible. In this embodiment, a traffic flow $F_{CS}$ annually intercepted by a system-wide charging station is calculated by using a gravity space interaction model in combination with a Floyd algorithm. A calculation formula thereof is as follows:

Calculate a traffic flow intercepted by a single charging station according to the following formulas:

$$f_{k,t}^{road} = \frac{\omega_{ko}\omega_{kd}}{D_k^{1.5}} \cdot \frac{\sigma_t}{\sigma_{RH}}, k \in \Omega_{od}, t \in T \quad (3)$$

$$F_{CS} = 365 \cdot \sum_{t=1}^{24} \sum_{k \in \Omega_{od}} f_{k,t}^{road} x_k^{load} \quad (4)$$

in the formula (3): $f_{k,t}^{road}$ denotes a per-unit value of a one-way traffic flow demand of the shortest path k in a period t; $\omega_{ko}$ and $\omega_{kd}$ are traffic demand weights of a starting point and an ending point of the path k respectively, used to indicate busyness degrees of traffic nodes; $D_k$ is a per-unit value of the length of the path k; $\sigma_t$ and $\sigma_{RH}$ are travel ratios of EV users in a period t and a peak hour h respectively; $\Omega_{od}$ is a set of shortest paths (OD paths) from any starting point o to any ending point d in the traffic network and is obtained according to the Floyd algorithm; T is a set of periods; and $x_k^{load}$ indicates a binary variable of whether a flow on the path k can be intercepted by a charging station, if the path k passes through the charging station, the variable is 1, and otherwise, the variable is 0.

The traffic flow intercepted by the system throughout the year can be used as one of the criteria to evaluate the satisfaction of the traffic network. At the same time, $f_{k,t}^{road}$ may also affect the average arrival rate $\lambda_{i,t}$ and the charge power $P_{i,t}^{CS}$ of to-be-charged vehicles at the node i in each period, and the number of charging devices to be configured at the charging station. It is assumed herein that $\lambda_{i,t}$ is directly proportional to the traffic flow intercepted by the charging station and the EV travel ratio.

Calculate an equivalent charging load according to the traffic flow intercepted by the single charging station in the following calculation manners:

$$f_{i,t}^{CS} = \sum_{k \in \Omega_{od}} f_{k,t}^{road} x_{k,i}^{road} x_i^{CS}, i \in \Omega, t \in T \quad (5)$$

$$\lambda_i^{RH} = \max\left\{\lambda_{i,t} \mid \lambda_{i,t} = \tilde{F}^{CS} \frac{\sigma_t}{\sum_{t \in T}\sigma_t} \cdot \frac{f_{i,t}^{CS}}{\sum_{i \in \Omega}f_{i,t}^{CS}}\right\}, i \in \Omega \quad (6)$$

$$P_{i,t}^{CS} = p^{CS}\frac{\lambda_{i,t}}{\mu}, i \in \Omega, t \in T \quad (7)$$

in the formula (5), $f_{i,t}^{CS}$ is a traffic flow intercepted by a node i in a period t; $x_{k,i}^{road}$ is a binary variable of whether the path k passes through the node i; $x_i^{CS}$ is a binary variable of whether a charging station is constructed at the node i; $\Omega$ is a set of network nodes; $\lambda_{i,t}$ is the number of electric vehicles arriving at the charging station located at the node i at time t to receive a charging service; in the formula (6), $P_{i,t}^{CS}$ is a charge power of the node i at the time t; $\lambda_i^{RH}$ is an average arrival rate of to-be-charged vehicles at the node i during rush hours, i.e. the number of EVs arriving at the charging station to receive the charging service per unit of time; $\tilde{F}^{CS}$ is a total daily charging frequency demand of an EV charging station and needs to be calculated according to $W_B$ in the formula (2); $\tilde{F}^{CS} = W_B$/preset maximum battery pack capacity, and in a particular example, the preset maximum battery pack capacity=90 Ah; $W_B$ is a charging capacity; in the formula (7), $p^{CS}$ is a charge power of a single charging device; and $\mu$ is an average service rate of a single device, in units of vehicles per hour.

Step S13: For a charging station, the level of service is largely determined by the average charging waiting time of drivers during rush hours. When the number of charging devices increases, the queuing problem at charging stations can be alleviated and the waiting time may be shortened, but the investment cost of the whole system may be increased. Therefore, the number of devices in each charging station can be configured by setting a threshold of the average charging waiting time and establishing relevant constraints, so as to achieve optimal investment in charging devices. It is assumed that an arrival process and charging service time of the to-be-charged vehicles at the charging station are simulated by using Poisson distribution and negative exponential distribution respectively. Transform, based on the M/M/s queuing model, a capacity determination problem of a charging station into the following non-linear integer planning problems:

$$\min z_i^{CS} \quad (8)$$

$$s.t.\begin{cases} W_i^{RH} < W^{allowed} & (9) \\ z_i^{CS} \geq \frac{\lambda_i^{RH}}{\mu} \end{cases}, \forall i \in \Omega$$

$$W_i^{RH} = P_i^{non}\frac{(z_i^{CS}\rho_i^{RH})^{z_i^{CS}}\rho_i^{RH}}{\lambda_i^{RH}(z_i^{CS})!(1-\rho_i^{RH})^2}, \lambda_i^{RH} \neq 0 \quad (10)$$

$$P_i^{non} = \left[\sum_{n=0}^{z_i^{CS}-1}\frac{(z_i^{CS}\rho_i^{RH})^n}{n!} + \frac{(z_i^{CS}\rho_i^{RH})^{z_i^{CS}}}{(z_i^{CS})!(1-\rho_i^{RH})}\right]^{-1} \quad (11)$$

$$\rho_i^{RH} = \frac{\lambda_i^{RH}}{z_i^{CS}\mu} \quad (12)$$

in the formulas: $z_i^{CS}$ is the number of charging devices configured for the node i, which is multiplied by $p^{CS}$ s to obtain the capacity of the charging station at node i; $W_i^{RH}$ and $W^{aloWed}$ are an average waiting time for receiving a charging service during rush hours and a threshold thereof respectively; $P_i^{noon}$ the probability that charging station devices at the node i are all idle; and $\rho_i^{RH}$ is an average device usage rate of the node i during rush hours.

Behavioral scientists have found upon study that a person who stays in line for an average of more than 40 min or waits for an average of more than 10 min may get annoyed and leave. Considering the particularity of EV charging time, the threshold may be set to 0.1 h in the first constraint of the formula (9). On the other hand, the value of $z_i^{cs}$ has to meet the most basic charging frequency demand in order to ensure that an infinite long queue may not be formed, so the second constraint of the formula (9) needs to be set.

According to the above analysis, a core decision variable of the charging station location and capacity determination model considering a traffic flow is $x_i^{cs}$. The optimization process not only directly affects a satisfaction index of the traffic network, but also affects the level of the charge power and investment cost of the charging device. Therefore, the model may well associate a traffic demand with a power load, and further reflect a closely linked and mutually influencing relationship between a power distribution network and a traffic network.

In this embodiment, the distributed generation (including wind power and photovoltaic) has obvious intermittency and randomness, and is greatly restricted by meteorological conditions, but its output also has certain regularity with the change of seasons and time series. In terms of seasonal characteristics, WG output reaches its maximum in winter and its minimum in summer, while PV is just the opposite. In terms of time-series characteristics, WG reaches its maximum in the evening, while PV has a greater output at noon. Residential load, commercial load, and industrial load in daily life also have similar time-series rules, but the three main loads are different in nature and their change rules are not the same. Therefore, a typical day may be selected in four seasons respectively, and 24 moments may be used to simulate DG output and load power scenarios in each season, which are combined into 96 scenarios in the whole year. Curves of time-series characteristics of wind-solar output and three main loads are shown in FIG. 1 to FIG. 5.

Step S2 particularly includes:
  establishing the active distribution network model, and sampling, based on a time series method, typical output and different types of typical load curves of distributed generation including wind power and photovoltaic, to obtain a DG output value $P_{DGi}(t)$ and a load value $P_{Li}(t)$ of the node i at the time t; and establishing an energy storage model based on an equivalent load principle, an energy storage element adjusting strategy being as follows:

In this embodiment, energy is stored through an accumulator, and a coordinated optimization strategy for energy storage based on an equivalent load is proposed. It is assumed that the output power of wind and photovoltaic power generation is constant in each scenario, and a typical day in the time-series characteristics is used as a cycle for study. Firstly, calculate an equivalent load $P_{eqi}$ and an average equivalent load $P_{avi}$ of the node i at the time t, $$P_{eqi}(t) = P_{Li}(t) - P_{DGi}(t) \tag{13}$$

$$P_{avi} = \sum_{t=1}^{24} P_{eqi}(t)/24 \tag{14}$$

in the formulas: $P_{Li}(t)$ and $P_{DGi}(t)$ represent a load value and a DG output value of the node i at the time t.

The coordinated optimization strategy based on energy storage particularly includes the following contents:

(1) If $P_{eqi}$ is far less than $P_{avi}$, it indicates that the electric load is at the trough, and the accumulator can store the excess DG power by charging. Therefore, when $P_{eqi}(t)+\Delta P \ll P_{avi}$, an accumulator is charged, and $\Delta P_1$ is a charge power.

(2) After charge for a period of time, if $P_{eqi}$ is slightly less than $P_{avi}$, it indicates that output and demand are close to equilibrium. In this case, in order to suppress the fluctuation of the equivalent load, charging conditions need to be adjusted. If $|P_{eqi}(t)+\Delta P_1 P_{avi}| \leq \delta P_{avi}$ is met, the accumulator is charged; δ represents a fluctuation coefficient of $P_{eqi}$ around a mean value thereof, which is set to 0.8 in this embodiment.

(3) If $P_{eqi}$ is far greater than $P_{avi}$, it indicates that the electric load is at the peak and the accumulator needs to release power. Therefore, when $P_{eqi}(t)-\Delta P_2 \gg P_{avi}$, the accumulator is discharged, and $\Delta P_2$ is a discharge power.

(4) After discharge for a period of time, if $P_{eqi}$ is slightly greater than $P_{avi}$, it indicates that output and demand are close to equilibrium. In this case, in order to suppress the fluctuation of the equivalent load, discharging conditions need to be adjusted. If $|P_{eqi}(t)-\Delta P - P_{avi}| \leq \delta P_{avi}$ is met, the accumulator is discharged.

In this embodiment, step S3 particularly includes:
an objective function of the nested planning model being:

$$\min \begin{cases} f_1 = \dfrac{r(1+r)^\eta}{(1+r)^\eta - 1} C^{inv} + C^{ope} \\ f_2 = \sum_{s=1}^{96}\sum_{i=1}^{n} U_{s,i}^{level}/(96 \cdot n), i \in \Omega, s \in \Omega_s \\ f_3 = 1 / \left(365 \cdot \sum_{t=1}^{24}\sum_{k \in \Omega_{od}} f_{k,t}^{road} x_k^{load}\right), t \in T \end{cases} \tag{15}$$

$$C^{inv} = p^{DG}\left(c_1^{PV}\sum_{j \in \Omega^{PV}} N_j + c_1^{WG}\sum_{k \in \Omega^{WG}} N_j\right) + \\ c^{CS}\sum_{i \in \Omega} z_i^{CS} x_i^{CS} + \sum_{k \in \Omega^{BS}} x_k^{BS}(c_1^{BS} S_{max}^{BS} + c_2^{BS} P_{max}^{BS}) \tag{16}$$

$$C^{ope} = c_2^{PV}\sum_{s \in \Omega_s}\sum_{j \in \Omega^{PV}} \Delta t_s P_{s,j}^{PV} + \\ c_2^{WG}\sum_{s \in \Omega_s}\sum_{j \in \Omega^{WG}} \Delta t_s P_{s,j}^{WG} + \sum_{s \in \Omega_s} f_e(s)P_{em}(s)\Delta t_s \tag{17}$$

$$P_{em}(s) = \\ \sum_{i=1}^{n}(P_{s,i}^L + P_{s,i}^{CS}) - \left(\sum_{j \in \Omega^{PV}} P_{s,j}^{PV} + \sum_{j \in \Omega^{WG}} P_{s,j}^{WG}\right) + P_s^{loss} \tag{18}$$

$$U_{s,i}^{level} = \begin{cases} \dfrac{V_{s,i} - 1}{V^{min} - 1}, V^{min} < V_{s,i} \leq 1 \\ \dfrac{V_{s,i} - 1}{V^{max} - 1}, 1 < V_{s,i} < V^{max} \\ 1.0, V_{s,i} \geq V^{max}; V_{s,i} \leq V^{min} \end{cases} \tag{19}$$

in the formulas: $f_1$ denotes an economic cost, including a construction cost $C^{inv}$ and an operation cost $C^{ope}$; r is a discount rate; η is an investment life; $f_2$ denotes a voltage quality index; $U_{s,i}^{level}$ is a voltage quality evaluation function value of the node i in a scenario s; n is the total number of network nodes; Ω denotes a set of nodes; $\Omega_S$ is a set of scenarios; $f_3$ denotes a traffic network satisfaction index; $\Omega_{bd}$ is a set of shortest paths from any starting point o to any ending point d in the traffic network; $f_{k,t}^{road}$ denotes a per-unit value of a one-way traffic flow demand of the shortest path k in a period t; $x_k^{load}$ denotes a binary variable of whether a flow on the path k is intercepted by a charging state; T is a set of periods; $p^{DG}$ is a DG unit capacity; $x_i^{CS}$ is a binary variable of whether a charging station is constructed at the node i; $c_1^{PV}$ and $c_1^{WG}$ are investment costs per unit capacity of photovoltaic and wind power generation respectively; $\Omega^{PV}$ and $\Omega^{WG}$ are sets of nodes for mounting photovoltaic and fans; $N_j$ is the number of DGs of the $j^{th}$ mounting node; $c^{CS}$ is investment cost of each charging device; $x_k^{BS}$ is a binary variable of whether a node k is put into an energy storage device; $\Omega^{BS}$ is a set of nodes for mounting energy storage; $c_1^{BS}$ and $c_2^{BS}$ are a unit capacity cost and a charge-discharge power cost of the energy storage device respectively; $S_{max}^{BS}$ and $P_{max}^{BS}$ are maximum energy storage capacity and maximum charge-discharge power respectively; $c_2^{PV}$ and $c_2^{WG}$ are unit operation costs of photovoltaic and wind power generation respectively; $\Delta t_s$ is an annual cumulative operation time of a distribution network in a scenario s; $P_{s,j}^{PV}$ and $P_{s,j}^{WG}$ are outputs of the $j^{th}$ PV or WG in the scenario s; $f_e(s)$ and $P_{em}(s)$ are electricity price and electric power demands in the scenario s respectively; $P_{s,i}^L$ and are a load power and an EV charge power of the node i in the scenario s; $P_s^{loss}$ is electric energy loss in the scenario s; $V_{s,i}$ is a voltage amplitude of the node i in the scenario s; and $V^{min}$ and $V_{max}$ are an allowable lower limit and an allowable upper limit of a node voltage respectively.

Constraints of the nested planning model include traffic network constraints and power grid constraints, and the traffic network constraints are as follows:

$$\begin{cases} W_i^{RH} < W^{allowed} \\ z_i^{CS} \geq \frac{\lambda_i^{RH}}{\mu} \end{cases}, \forall i \in \Omega \quad (20)$$

$$\sum_{i \in \Omega} x_i^{CS} \leq N^{CS} \quad (21)$$

$$\sum_{i \in \Omega} \sum_{k \in \Omega_{od}} f_{k,t}^{road} x_{k,i}^{road} x_i^{CS} \geq \sum_{k \in \Omega_{od}} f_{k,t}^{road}, \forall t \in T \quad (22)$$

$$W_i^{RH} = P_i^{non} \frac{(z_i^{CS} \rho_i^{RH})^{z_i^{CS}} \rho_i^{RH}}{\lambda_i^{RH} (z_i^{CS})!(1-\rho_i^{RH})^2}, \lambda_i^{RH} \neq 0 \quad (23)$$

$$P_i^{non} = \left[ \sum_{n=0}^{z_i^{CS}-1} \frac{(z_i^{CS} \rho_i^{RH})^n}{n!} + \frac{(z_i^{CS} \rho_i^{RH})^{z_i^{CS}}}{(z_i^{CS})!(1-\rho_i^{RH})} \right]^{-1} \quad (24)$$

$$\rho_i^{RH} = \frac{\lambda_i^{RH}}{z_i^{CS} \mu} \quad (25)$$

in the formulas: $z_i^{CS}$ is the number of charging devices configured for the node i, which is multiplied by $p^{CS}$ to obtain a charge power of a single charging device at the node i; $\lambda_i^{RH}$ is an average arrival rate of to-be-charged vehicles at the node i during rush hours, i.e. the number of EVs arriving at the charging station to receive the charging service per unit of time; $x_{k,i}^{road}$ denotes a binary variable of whether a flow on the path k can be intercepted by a charging station; $\Omega_{bd}$ is a set of shortest paths from any starting point o to any ending point d in the traffic network; $W_i^{RH}$ and $W^{allowed}$ are an average waiting time for receiving a charging service during rush hours and a threshold thereof respectively; $P_i^{noon}$ is the probability that charging station devices at the node i are all idle; $\rho_i^{RH}$ is an average device usage rate of the node i during rush hours; $N^{CS}$ is the maximum number of charging stations to be constructed; and μ is an average service rate of a single device;

the power grid constraints are as follows:

power flow constraints of the power distribution network:

$$\begin{cases} P_{s,i}^L + P_{s,i}^{CS} - P_{s,i}^{DG} = V_{s,i} \sum_{j=1}^{n} V_{s,j}(G_{ij}\cos\delta_{s,ij} + B_{ij}\sin\delta_{s,ij}) \\ Q_{s,i}^L + Q_{s,i}^{DG} = V_{s,i} \sum_{j=1}^{n} V_{s,j}(G_{ij}\sin\delta_{s,ij} + B_{ij}\cos\delta_{s,ij}) \end{cases} \forall s \in \Omega_s, \quad (26)$$

$$i \in \Omega$$

scenario chance constraints:

$$Pr\{V^{min} \leq V_{s,i} \leq V^{max}, |P_{s,ij}| \leq P_{ij}^{max}\} = \frac{K_s}{96} \geq \gamma \forall i \in \Omega, \forall ij \in \Omega^{Line} \quad (27)$$

DG mounting capacity constraints:

$$\begin{cases} 0 \leq P_{s,j}^{PV} \leq \overline{P}_{s,j}^{PV}, \forall s \in \Omega_s, j \in \Omega^{PV} \\ 0 \leq P_{s,j}^{WG} \leq \overline{P}_{s,j}^{WG}, \forall s \in \Omega_s, j \in \Omega^{WG} \\ \sum_{s \in \Omega_s} (P_{s,j}^{PV} + P_{s,j}^{WG}) \leq \varepsilon \sum_{s \in \Omega_s} \sum_{i=1}^{n} P_{s,i}^L \end{cases} \quad (28)$$

energy storage capacity and charge-discharge power constraints:

$$\begin{cases} 0 \leq S_k^{BS} \leq S_{max}^{BS}, \\ 0 \leq P_k^{BS} \leq P_{max}^{BS}, \end{cases} \forall k \in \Omega^{BS} \quad (29)$$

in the formulas: $Q_{s,i}^L$ is a reactive load of the node i in the scenario s; $P_{s,i}^{DG}$ and $Q_{s,i}^{DG}$ are DG active and reactive outputs of the node i in the scenario s; $V_{s,j}$ is a voltage amplitude of a node j in the scenario s; $G_{ij}$ and $B_{ij}$ are real part and imaginary part of network admittances respectively; $S_{s,ij}$ is a voltage phase angle difference of the nodes i and j in the scenario s; $P_{s,ij}$ and $P_{ij}^{max}$ are a power flowing through a line ij and a power limit; $K_s$ is the number of scenarios meeting chance constraints; γ is a confidence coefficient; $\Omega^{Line}$ is a set of power distribution network lines; $\overline{P}_{s,j}^{PV}$ and $\overline{P}_{s,j}^{WG}$ are output upper limits of PV and WG respectively; ε is a maximum penetration rate of DG access; and $S_k^{BS}$ and area current device capacity and a charge-discharge power of an energy storage node k respectively.

Figure 6:
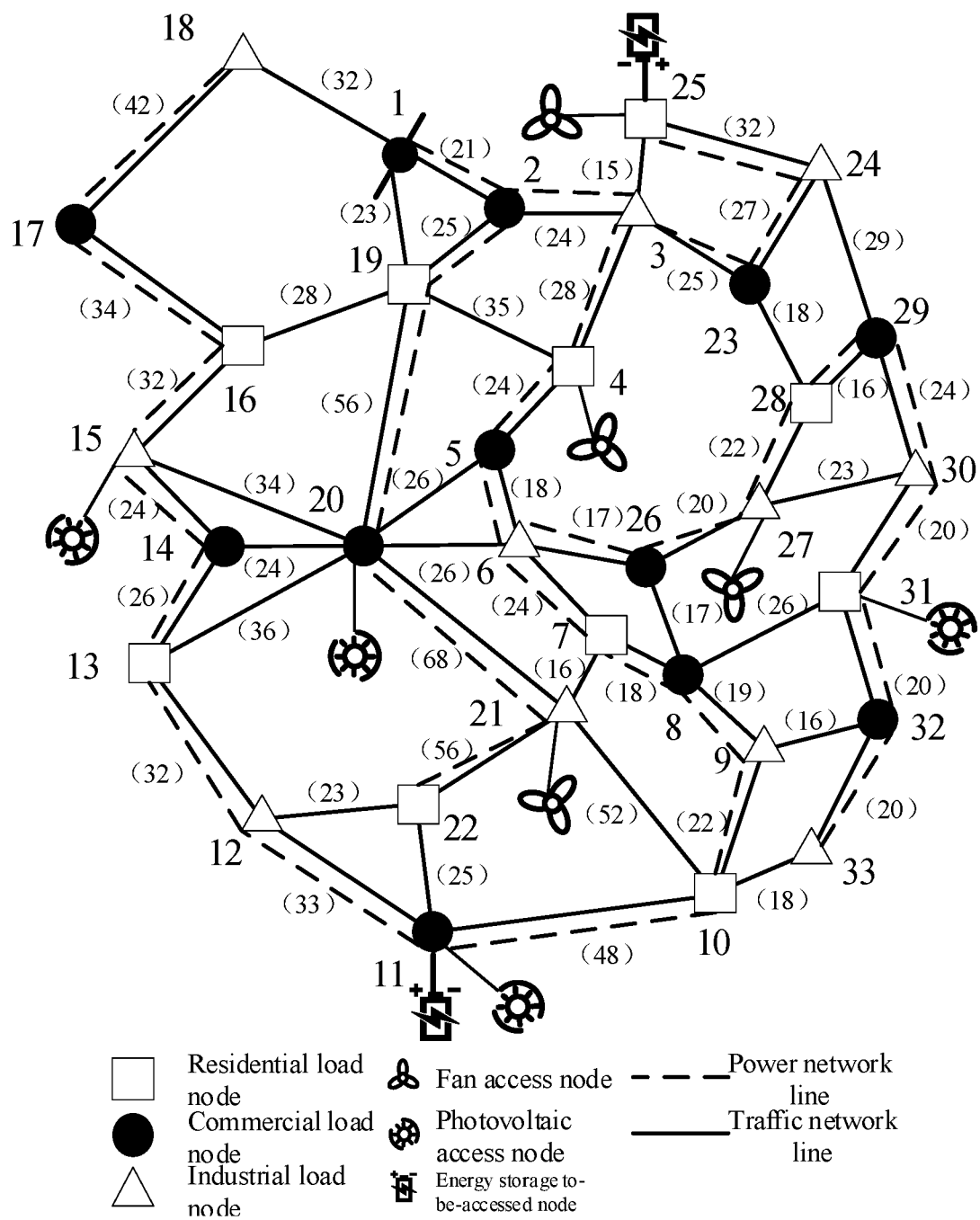
FIG. 6 is a topological diagram of a coupling network of a power distribution network and a traffic network according to an embodiment of the present disclosure.

In order to demonstrate the superiority of the planning model of the present disclosure, in this embodiment, a coupling topology structure of traffic network-power distribution network as shown in FIG. 6 is used to simulate and verify the model of the present disclosure.

In a simulation example of this embodiment, in combination with engineering practice, a unit capacity of a DG node is set to 0.1 MW, the number of installations is limited to 20, the maximum energy storage capacity is 3 MWh, and a single maximum charge and discharge power of the accumulator is 0.3 MW. A constraint range of a node voltage amplitude is 0.95 to 1.05 pu. The number of locations for charging stations is limited to 8.

An NSGA-II algorithm is used to solve the simulation example of this embodiment. Since the NSGA II algorithm is an existing very mature solution algorithm, a detailed calculation method of the algorithm is not repeated in this application. A maximum iteration number of the NSGA II algorithm is set to 50, a population size to 150, a crossover rate to 0.9, a variation rate to 0.1, and a polynomial variation index to 20. Parameters related to economic costs, vehicle flow weights at traffic nodes and the travel ratio of EVs in each period are shown in Table 1 to Table 3.

TABLE 1

Parameters related to economic costs

| Parameter | Value | Parameter | Value |
|---|---|---|---|
| Planned investment life | 10 years | Discount rate | 10% |
| WG construction cost | 873.6 $/kW | WG operation cost | 0.022 $/kWh |
| PV construction cost | 1 164.8 $/kW | PV operation cost | 0.03 $/kWh |
| Energy storage power cost | 730.9 $/kW | Energy storage capacity cost | 208.2 $/kWh |
| Charging device cost | 5.96 × 10$^4$ $ per vehicle | Calculation of depreciation factor | 0.1627 |
| Electricity price parameter $\theta_2$ | 30 $/MW$^2$ | Electricity price parameter $\theta_1$ | 15 $/MW |

TABLE 2

Vehicle flow weights at traffic nodes

| Node number | Weight |
|---|---|
| 1 | 0.54 |
| 2 | 0.8 |
| 3 | 1.2 |
| 4 | 0.87 |
| 5 | 1.26 |
| 6 | 1.7 |
| 7 | 1.5 |
| 8 | 0.94 |
| 9 | 0.97 |
| 10 | 0.54 |
| 11 | 0.35 |
| 12 | 0.34 |
| 13 | 0.15 |
| 14 | 0.35 |
| 15 | 0.28 |
| 16 | 0.6 |
| 17 | 0.28 |
| 18 | 0.37 |
| 19 | 1.08 |
| 20 | 0.95 |
| 21 | 0.62 |
| 22 | 0.55 |
| 23 | 0.65 |
| 24 | 0.34 |
| 25 | 0.45 |
| 26 | 0.63 |
| 27 | 1.1 |
| 28 | 0.54 |
| 29 | 0.6 |
| 30 | 0.32 |
| 31 | 0.21 |
| 32 | 0.34 |
| 33 | 0.28 |

TABLE 3

Travel ratio of electric vehicles in each period

| Period | Percentage |
|---|---|
| 1 | 0.44 |
| 2 | 0.21 |
| 3 | 0.11 |
| 4 | 0.07 |
| 5 | 0.19 |
| 6 | 0.81 |
| 7 | 2.54 |
| 8 | 6.13 |
| 9 | 7.69 |
| 10 | 5.61 |
| 11 | 6.45 |
| 12 | 6.57 |
| 13 | 6.51 |
| 14 | 6.91 |
| 15 | 6.98 |
| 16 | 7.21 |
| 17 | 8.78 |
| 18 | 9.05 |
| 19 | 5.28 |
| 20 | 4.41 |
| 21 | 2.78 |
| 22 | 2.06 |
| 23 | 1.95 |
| 24 | 1.26 |

Electric vehicle related information simulating the system is shown in Table 4. The transformer efficiency and the charger efficiency used in the charging station herein are 95% and 90% respectively. According to the calculation of formulas (A1) and (A2), the total daily demand of battery packs in the region is 2284, and the average daily charging capacity demand is 11,086.1 kWh. It is assumed that the single charging capacity of each EV is 30 kWh and the charge power of a single charging device is 60 kW, the total daily charging frequency of all charging stations is 370 times, and an average service rate of a single device is 0.5.

TABLE 4

Regional electric vehicle related information

| EV type | Daily mileage/km | Daily mileage upon one charging/km | Number of vehicle-mounted battery packs/ | Attendance rate/% | Battery replacement ratio/% | Stock of electric vehicles/ per vehicle |
|---|---|---|---|---|---|---|
| Bus | 280 | 140 | 4 | 100 | 100 | 36 |
| Service car | 200 | 100 | 3 | 71.4 | 100 | 28 |
| Taxi | 300 | 150 | 4 | 75 | 100 | 54 |
| Private car | 50 | 100 | 3 | 75 | 50 | 2032 |
| Other vehicles (sanitation vehicles, postal vehicles, etc.) | 90 | 60 | 2 | 50 | 20 | 453 |

Figure 7:
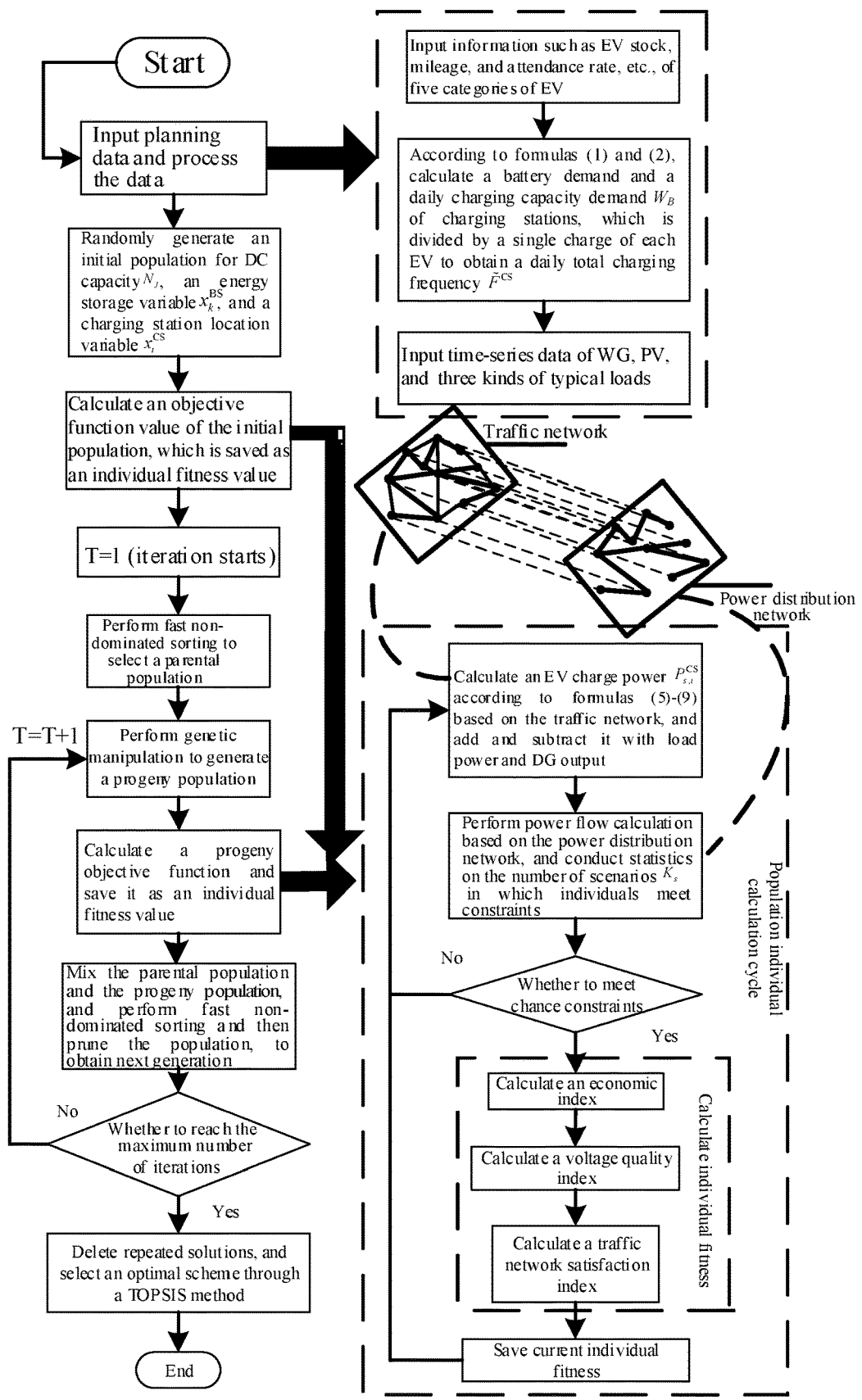
FIG. 7 is a flowchart of solution to a planning model according to an embodiment of the present disclosure.

The simulation example of this embodiment relates to two parts: a power distribution system and a traffic network, and the solution process is shown in FIG. 7.

(1) Data required by planning is inputted, a daily charging demand of charging stations is calculated based on various kinds of EV information, and time-series data of DG and load is simulated.

(2) An initial population is randomly generated, and an objective function value of individuals satisfying chance constraints is calculated based on the coupled power distribution network and traffic network.

(3) Fast non-dominated sorting is performed on the initial population, and a progeny population is obtained by selecting a high-quality male parent for genetic manipulation based on sequence and crowding information of individuals.

(4) Based on the coupled network, an objective function value of the progeny population is calculated, then all progeny individuals are mixed with parental individuals, and an elitist strategy is adopted to prune the population size to obtain a new male parent.

(5) It is judged whether the maximum number of iterations is reached. If yes, exit the calculation; otherwise, go back to step (3) and continue the iteration.

(6) After the iteration, repeated solutions in the final population are deleted, then target values of the remaining schemes are dimensionless, and standard deviations of targets of all schemes are calculated. Finally, based on a mean square deviation method, weights of respective objective functions are set according to the principle of proportional allocation, and an optimal compromise scheme is determined by a technique for order preference by similarity to an ideal solution (TOPSIS). Its particular operation process may be obtained with reference to references. As the TOPSIS algorithm is a relatively mature technology, it is not repeated in this application.

Calculation results of this embodiment areas shown in Table 5 and Table 6.

TABLE 5

DG node configuration results

| WG | Configuration capacity/ MW | Whether to install energy storage | WG | Configuration capacity/ MW | Whether to install energy storage |
|---|---|---|---|---|---|
| 4 | 1.7 | ✓ | 11 | 1.7 | ✓ |
| 21 | 0 | x | 15 | 1.8 | ✓ |
| 25 | 1.4 | ✓ | 20 | 0.2 | ✓ |
| 27 | 2.0 | ✓ | 31 | 2.0 | ✓ |

TABLE 6

Planning results of electric vehicle charging stations

| Location node | Configuration capacity/MW | Location node | Configuration capacity/MW |
|---|---|---|---|
| 3 | 0.24 | 19 | 0.18 |
| 6 | 0.30 | 20 | 0.30 |
| 7 | 0.18 | 26 | 0.30 |
| 9 | 0.24 | 28 | 0.24 |

The economic cost corresponding to the optimal scheme is 14.114 million dollars, the voltage quality index is 0.061 pu, and the traffic satisfaction index is $1.3 \times 10^{-6}$ pu, that is, the annual intercepted traffic flow value is $7.68 \times 10^5$ pu.

Figure 8:
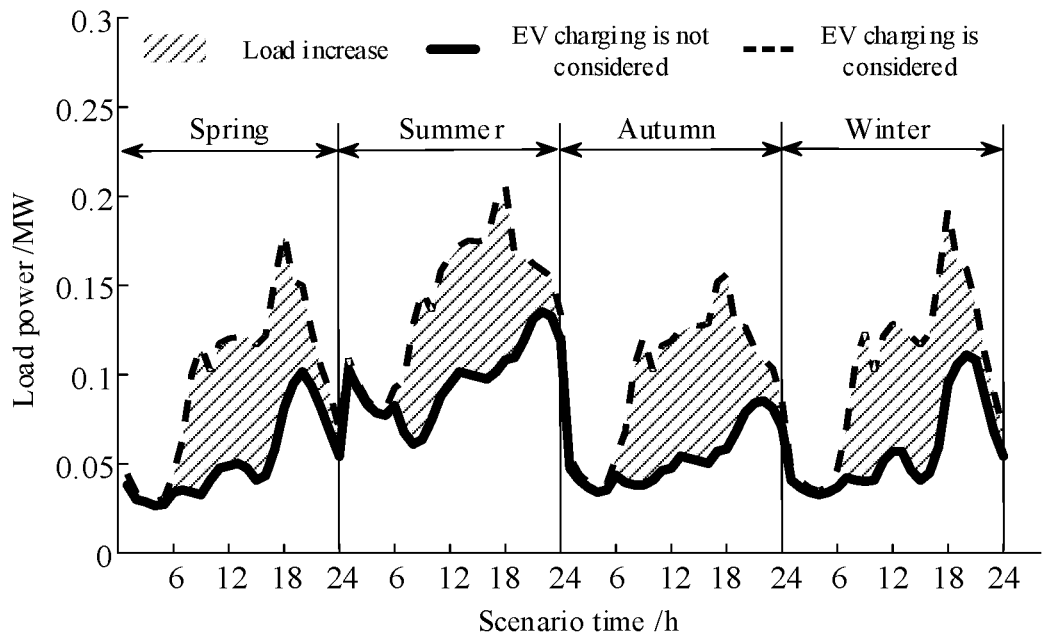
FIG. 8 is a diagram of load time-series characteristics before and after charging of a 19 EV according to an embodiment of the present disclosure.
Figure 9:
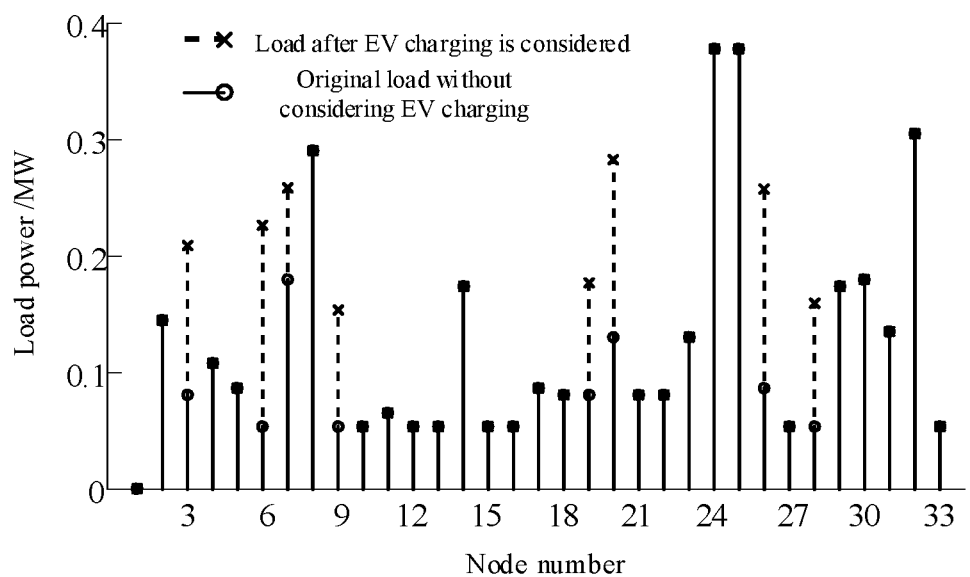
FIG. 9 is a diagram of load time-series characteristics before and after charging of an EV in spring peak hours according to an embodiment of the present disclosure.
Figure 10:
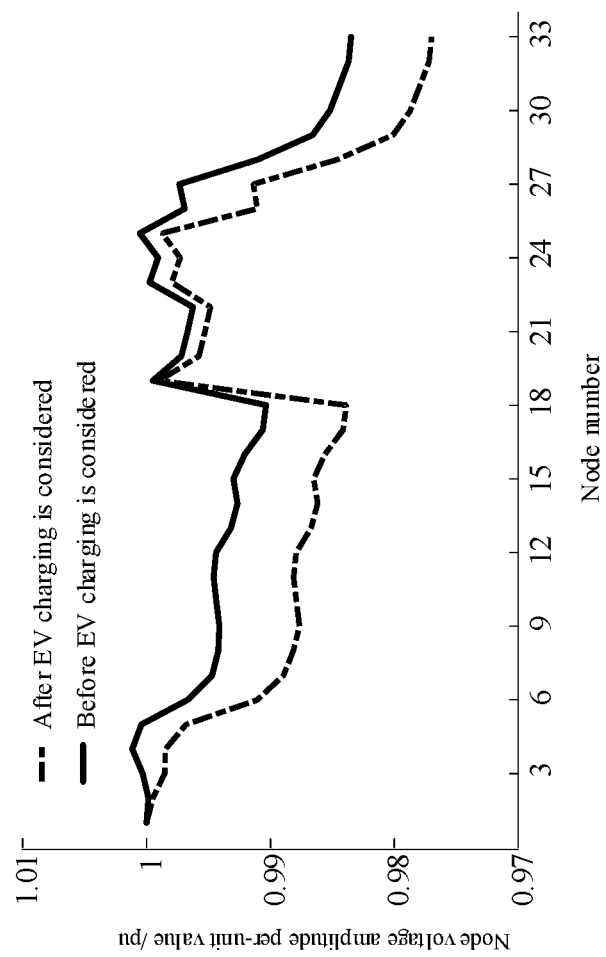
FIG. 10 is a diagram of node voltage amplitudes before and after charging of an EV in spring peak hours according to an embodiment of the present disclosure.

Planning analysis results of electric vehicle charging stations are shown in FIG. 8 to FIG. 10.

From the perspective of planning results, in order to capture as much traffic flow in the traffic network as possible and meet EV charging demands of users to the maximum extent, station nodes are generally selected in positions with a large vehicle flow weight (such as nodes 3, 6, and 7) or hub positions of the traffic network (such as nodes 19, 20, and 26). In Table 6, the sum of vehicle flow weights at the location node is 8.57, accounting for 39.6% of the weights of the entire traffic network. At the same time, the charging stations can capture 190.54 pu of the daily traffic flow during rush hours, accounting for 90.9% of the total traffic flow during rush hours. As can be seen, the satisfaction index constructed in the model can effectively help station construction nodes to capture as much traffic flow as possible and provide charging services for more EV users without changing the original driving path.

On the other hand, EV charging may increase the charging load of the station construction node and change the load time-series characteristics of the node. Taking a node 19 as an example, the load time-series curve before and after EV charging is considered as shown in FIG. 8.

As shown in FIG. 8, considering EV charging is equivalent to raising the load curve of the station construction node, making the load level heavier. At the same time, the travel ratio of EVs in each period may also affect the characteristics of the time-series curve. With reference to Table 3, electric vehicles mainly travel between 8:00 and 20:00. Therefore, in FIG. 8, there are more load increments in the corresponding periods of typical days in the seasons, especially at 18:00 in the peak hour, when the load power reaches its peak.

Location and capacity determination planning of EV charging stations may not only change the load time-series characteristics of station construction nodes, but also change the load level of the entire distribution network nodes, thus affecting the voltage quality of the nodes. Taking the peak period in spring as an example, the system load level before and after EV charging is considered as shown in FIG. 9, and the node voltage amplitude distribution of the corresponding scenario is shown in FIG. 10.

As can be seen from FIG. 9, during the peak travel period of electric vehicles, the load powers of eight station construction nodes all increase significantly, especially the load of the node 6 increases by more than three times, and the load of nodes 9, 26, and 28 increased by nearly two times. The eight nodes are basically distributed in front and middle ends of the circuit in the power network, which is bound to increase the voltage drop in the front and middle ends of each branch.

In FIG. 10, the large increase of the load on nodes 6 and 9 causes the voltage to significantly drop in the branch between nodes 3 to 18, and the large increase of the load on nodes 26 and 28 causes the voltage to significantly drop in the branch between nodes 26 to 33. The voltage quality index proposed herein is used to evaluate the voltage level of the system in the two cases. The estimated value before EV charging is 0.0824, and the estimated value after consideration of the charging load is 0.1459, which decreases by 77.1%. As can be seen, this part of charging load may lead to a greater impact on the network during rush hours, reducing the node voltage level of the system.

The above are only preferred embodiments of the present disclosure, and any equal changes and modifications made in accordance with the scope of the invention application patent all come within the scope of the present disclosure.

The invention claimed is:

1. A method for establishing an active distribution network planning model considering location and capacity determination of an electric vehicle charging station, comprising the following steps:
    step S1: establishing a traffic network, and establishing, based on an M/M/s queuing model and a flow capturing location model, a traffic network comprising an electric vehicle charging station;
    step S2: establishing an active distribution network model, and establishing a distributed generation and load time-series model based on a time series method; and establishing an energy storage model based on an equivalent load principle; and
    step S3: converting a traffic flow of electric vehicles into an equivalent load of an equivalent charging station, coupling the traffic network with a power grid, and establishing an active distribution network nested planning model considering the traffic network;
    wherein step S1 particularly comprises:
    step S11: calculating an EV charging capacity demand; calculating a battery pack quantity demand;

$$N_B = \sum_{i=1}^{5} \left( N_{EVi} \frac{L_{di}}{L_{0i}} a_i b_i K_{EVdi} \right) \quad (1)$$

in the formula: $N_B$ is a daily demand for battery packs; $N_{EVi}$ is a stock of an $i^{th}$-type EV: $L_d$ and $L_{0i}$ are respectively an average daily mileage of the $i^{th}$-type EV and a distance at which the $i^{th}$-type EV travels on a full charge; and $a_i$, $b_i$, and $K_{EVdi}$ are respectively attendance rates, a battery replacement ratio, and the number of battery packs per vehicle for the $i^{th}$-type EV;
the charging capacity demand is:

$$W_B = N_B P_c t_{charge}/(\eta_{tran}\eta_{charge}) \quad (2)$$

in the formula: $\eta_{tran}$ is transformer efficiency; $\eta_{charge}$ is charger efficiency; $P_c$ denotes an average charge power; and $t_{charge}$ denotes a charging time;
step S12: establishing a charging station location and capacity determination model;
calculating a traffic flow $F_{CS}$ annually intercepted by a system-wide charging station by using a gravity space interaction model in combination with a Floyd algorithm; of which a calculation formula is as follows; and
calculating a traffic flow intercepted by a single charging station according to the following formulas:

$$f_{k,t}^{road} = \frac{\omega_{ko}\omega_{kd}}{D_k^{1.5}} \cdot \frac{\sigma_t}{\sigma_{RH}}, k \in \Omega_{od}, t \in T \quad (3)$$

$$F_{CS} = 365 \cdot \sum_{t=1}^{24} \sum_{k \in \Omega_{od}} f_{k,t}^{road} x_k^{load} \quad (4)$$

in the formula (3): $f_{k,t}^{road}$ denotes a per-unit value of a one-way traffic flow demand of the shortest path k in a period t: $\omega_{ko}$ and $\omega_{kd}$ are traffic demand weights of a starting point and an ending point of the path k respectively, used to indicate busyness degrees of traffic nodes; $D_k$ is a per-unit value of the length of the path k; $\sigma_t$ and $\sigma_{RH}$ are travel ratios of EV users in a period t and a peak hour h respectively; $\Omega_{od}$ is a set of shortest paths from any starting point o to any ending point d in the traffic network and is obtained according to the Floyd algorithm; T is a set of periods; and $x_k^{load}$ indicates a binary variable of whether a flow on the path k can be intercepted by a charging station, if the path k passes through the charging station, the variable is 1, and otherwise, the variable is 0;
calculating an equivalent charging load according to the traffic flow intercepted by the single charging station in the following calculation manners;

$$f_{i,t}^{CS} = \sum_{k \in \Omega_{od}} f_{k,t}^{road} x_{k,i}^{road} x_i^{CS}, i \in \Omega, t \in T \quad (5)$$

$$\lambda_i^{RH} = \max\left\{\lambda_{i,t} | \lambda_{i,t} = \tilde{F}^{CS} \frac{\sigma_t}{\sum_{t \in T} \sigma_t} \cdot \frac{f_{i,t}^{CS}}{\sum_{i \in \Omega} f_{i,t}^{CS}}\right\}, i \in \Omega \quad (6)$$

$$P_{i,t}^{CS} = p^{CS} \frac{\lambda_{i,t}}{\mu}, i \in \Omega, t \in T \quad (7)$$

in the formula (5), $f_{i,t}^{CS}$ is a traffic flow intercepted by a node i in a period t; $x_{k,i}^{road}$ is a binary variable of whether the path k passes through the node i; $x_i^{CS}$ is a binary variable of whether a charging station is constructed at the node i; $\Omega$ is a set of network nodes: $\lambda_{i,t}$ is the number of electric vehicles arriving at the charging station located at the node i at time t to receive a charging service; in the formula (6), $P_{i,t}^{CS}$ is a charge power of the node i at the time t; $\lambda_t^{RH}$ is an average arrival rate of to-be-charged vehicles at the node i during rush hours, i.e. the number of EVs arriving at the charging station to receive the charging service per unit of time; $\tilde{F}^{CS}$ is a total daily charging frequency demand of an EV charging station and needs to be calculated according to $W_B$ in the formula (2): $\tilde{F}^{CS}=W_B$/preset maximum battery pack capacity; $W_B$ is a charging capacity: in the formula (7), $p^{CS}$ is a charge power of a single charging device; and $\mu$ is an average service rate of a single device, in units of vehicles per hour; and step S13: transforming, based on the M/M/s queuing model, a capacity determination problem of a charging station into the following nonlinear integer planning problems:

$$\min z_i^{CS} \tag{8}$$

$$\text{s.t.} \begin{cases} W_i^{RH} < W^{allowed} & (9) \\ z_i^{CS} \geq \dfrac{\lambda_i^{RH}}{\mu}, \forall i \in \Omega & \end{cases}$$

$$W_i^{RH} = P_i^{non} \dfrac{(z_i^{CS}\rho_i^{RH})^{z_i^{CS}} \rho_i^{RH}}{\lambda_i^{RH}(z_i^{CS})!(1-\rho_i^{RH})^2}, \lambda_i^{RH} \neq 0 \tag{10}$$

$$P_i^{non} = \left[\sum_{n=0}^{z_i^{CS}-1} \dfrac{(z_i^{CS}\rho_i^{RH})^n}{n!} + \dfrac{(z_i^{CS}\rho_i^{RH})^{z_i^{CS}}}{(z_i^{CS})!(1-\rho_i^{RH})}\right]^{-1} \tag{11}$$

$$\rho_i^{RH} = \dfrac{\lambda_i^{RH}}{z_i^{CS}\mu} \tag{12}$$

in the formulas: $z_i^{CS}$ is the number of charging devices configured for the node i, which is multiplied by $p^{CS}$ to obtain the capacity of the charging station at node i; $W_i^{RH}$ and $W^{allowed}$ are an average waiting time for receiving a charging service during rush hours and a threshold thereof respectively; $P_i^{non}$ is the probability that charging station devices at the node i are all idle; and $\rho_t^{RH}$ is an average device usage rate of the node i during rush hours.

2. The method for establishing an active distribution network planning model considering location and capacity determination of an electric vehicle charging station according to claim 1, wherein step S2 particularly comprises:
establishing the active distribution network model, and sampling, based on a time series method, typical output and different types of typical load curves of distributed generation comprising wind power and photovoltaic, to obtain a DG output value $P_{DGi}(t)$ and a load value $P_{Li}(t)$ of the node i at the time t; and establishing an energy storage model based on an equivalent load principle, an energy storage element adjusting strategy being as follows:
calculating an equivalent load $P_{eqi}$ and an average equivalent load $P_{avi}$ of the node i at the time t, $$P_{eqi}(t) = P_{Li}(t) - P_{DGi}(t) \tag{13}$$

$$P_{avi} = \sum_{t=1}^{24} P_{eqi}(t)/24 \tag{14}$$

in the formulas: $P_{Li}(t)$ and $P_{DGi}(t)$ represent a load value and a DG output value of the node i at the time t; and the energy storage element adjusting strategy is particularly as follows:

when $P_{eqi}(t)+\Delta P_1 \ll P_{avt}$, an accumulator is charged, and $\Delta P_1$ is a charge power;

if $|P_{eqi}(t)+\Delta P_1-P_{avt}| \leq \delta P_{avt}$ is met, the accumulator is charged; $\delta$ represents a fluctuation coefficient of $P_{eqi}$ around a mean value thereof;

when $P_{eqi}(t)-\Delta P_2 \gg P_{avi}$, the accumulator is discharged, and $\Delta P_2$ is a discharge power; and if $|P_{eqi}(t)-\Delta P-P_{avt}| \leq \delta P_{avt}$ is met, the accumulator is discharged.

3. The method for establishing an active distribution network planning model considering location and capacity determination of an electric vehicle charging station according to claim 1, wherein step S3 particularly comprises:
an objective function of the nested planning model being:

$$\min \begin{cases} f_1 = \dfrac{r(1+r)^\eta}{(1+r)^\eta - 1} C^{inv} + C^{ope} & (15) \\ f_2 = \sum_{s=1}^{96}\sum_{i=1}^{n} U_{s,i}^{level}/(96 \cdot n), i \in \Omega, s \in \Omega_s & \\ f_3 = 1 / \left(365 \cdot \sum_{t=1}^{24}\sum_{k \in \Omega_{od}} f_{k,t}^{road} x_k^{load}\right), t \in T & \end{cases}$$

$$C^{inv} = p^{DG}\left(c_1^{PV}\sum_{j \in \Omega^{PV}} N_j + c_1^{WG}\sum_{k \in \Omega^{WG}} N_j\right) + \tag{16}$$
$$c^{CS}\sum_{i \in \Omega} z_i^{CS} x_i^{CS} + \sum_{k \in \Omega^{BS}} x_k^{BS}(c_1^{BS} S_{max}^{BS} + c_2^{BS} P_{max}^{BS})$$

$$C^{ope} = \tag{17}$$
$$c_2^{PV}\sum_{s \in \Omega_s}\sum_{j \in \Omega^{PV}} \Delta t_s P_{s,j}^{PV} + c_2^{WG}\sum_{s \in \Omega_s}\sum_{j \in \Omega^{WG}} \Delta t_s P_{s,j}^{WG} + \sum_{s \in \Omega_s} f_e(s)P_{em}(s)\Delta t_s$$

$$P_{em}(s) = \sum_{i=1}^{n}(P_{s,i}^L + P_{s,i}^{CS}) - \left(\sum_{j \in \Omega^{PV}} P_{s,j}^{PV} + \sum_{j \in \Omega^{WG}} P_{s,j}^{WG}\right) + P_s^{loss} \tag{18}$$

$$U_{s,i}^{level} = \begin{cases} \dfrac{V_{s,i}-1}{V^{min}-1}, V^{min} < V_{s,i} \leq 1 \\ \dfrac{V_{s,i}-1}{V^{max}-1}, 1 < V_{s,i} < V^{max} \\ 1.0, V_{s,i} \geq V^{max}; V_{s,i} \leq V^{min} \end{cases} \tag{19}$$

in the formulas: $f_1$ denotes an economic cost, comprising a construction cost $C^{inv}$ and an operation cost $C^{ope}$; r is a discount rate: $\eta$ is an investment life; $f_2$ denotes a voltage quality index; $U_{s,t}^{level}$ is a voltage quality evaluation function value of the node i in a scenario S; n is the total number of network nodes; $\Omega$ denotes a set of nodes; $\Omega_S$ is a set of scenarios; $f_3$ denotes a traffic network satisfaction index: $\Omega_{od}$ is a set of shortest paths from any starting point o to any ending point d in the traffic network; $f_{k,i}^{road}$ denotes a per-unit value of a one-way traffic flow demand of the shortest path k in a period t; $x_k^{load}$ denotes a binary variable of whether a flow on the path k is intercepted by a charging state; T is a set of periods; $p^{DG}$ is a DG unit capacity; $x_i^{CS}$ is a binary variable of whether a charging station is constructed at the node i: $c_1^{PV}$ and $c_1^{WG}$ are investment costs per unit capacity of photovoltaic and wind power generation respectively; $\Omega^{PV}$ and $\Omega^{WG}$ are sets of nodes for mounting photovoltaic and fans; $N_j$ is the number of DGs of the $j^{th}$ mounting node; $c^{CS}$ is investment cost of each charging device; $x_k^{BS}$ is a binary variable of whether a node k is put into an energy storage device; $\Omega^{BS}$ is a set of nodes for mounting energy storage; $c_1^{BS}$ and $c_2^{BS}$ are a unit capacity cost and a charge-discharge power cost of the energy storage device respectively; $S_{max}^{BS}$ and $P_{max}^{BS}$ are maximum energy storage capacity and maximum charge-discharge power respectively; $c_2^{PV}$ and $c_2^{WG}$ are unit operation costs of photovoltaic and wind power generation respectively; $\Delta t_s$ is an annual cumulative operation time of a distribution network in a scenario s; $P_{s,t}^{PV}$ and $P_{s,j}^{WG}$ are outputs of the $j^{th}$ PV or WG in the scenario s; $f_e(s)$ and $P_{en}(s)$ are electricity price and electric power demands in the scenario s respectively; $P_{s,t}^L$ and $P_{s,t}^{CS}$ are a load power and an EV charge power of the node i in the scenario s; $P_s^{loss}$ is electric energy loss in the scenario s; $V_{s,j}$ is a voltage amplitude of the node i in the scenario s; and $V^{min}$ and $V^{max}$ are an allowable lower limit and an allowable upper limit of a node voltage respectively;

constraints of the nested planning model comprising traffic network constraints and power grid constraints, and the traffic network constraints being as follows:

$$\begin{cases} W_i^{RH} < W^{allowed} \\ z_i^{CS} \geq \dfrac{\lambda_i^{RH}}{\mu} \end{cases}, \forall i \in \Omega \tag{20}$$

$$\sum_{i \in \Omega} x_i^{CS} \leq N^{CS} \tag{21}$$

$$\sum_{i \in \Omega} \sum_{k \in \Omega_{od}} f_{k,t}^{road} x_{k,i}^{road} x_i^{CS} \geq \sum_{k \in \Omega_{od}} f_{k,t}^{road}, \forall t \in T \tag{22}$$

$$W_i^{RH} = P_i^{non} \dfrac{(z_i^{CS} \rho_i^{RH})^{z_i^{CS}} \rho_i^{RH}}{\lambda_i^{RH} (z_i^{CS})!(1-\rho_i^{RH})^2}, \lambda_i^{RH} \neq 0 \tag{23}$$

$$P_i^{non} = \left[ \sum_{n=0}^{z_i^{CS}-1} \dfrac{(z_i^{CS} \rho_i^{RH})^n}{n!} + \dfrac{(z_i^{CS} \rho_i^{RH})^{z_i^{CS}}}{(z_i^{CS})!(1-\rho_i^{RH})} \right]^{-1} \tag{24}$$

$$\rho_i^{RH} = \dfrac{\lambda_i^{RH}}{z_i^{CS} \mu} \tag{25}$$

in the formulas: $z_i^{CS}$ is the number of charging devices configured for the node i, which is multiplied by $p^{CS}$ to obtain a charge power of a single charging device at the node i; $\lambda_1^{RH}$ is an average arrival rate of to-be-charged vehicles at the node i during rush hours, i.e. the number of EVs arriving at the charging station to receive the charging service per unit of time; $x_{k,i}^{road}$ denotes a binary variable of whether a flow on the path k can be intercepted by a charging station; $\Omega_{od}$ is a set of shortest paths from any starting point o to any ending point d in the traffic network; $W_i^{RH}$ and $W^{allowed}$ are an average waiting time for receiving a charging service during rush hours and a threshold thereof respectively; $P_t^{non}$ is the probability that charging station devices at the node i are all idle; $\rho_i^{RH}$ is an average device usage rate of the node i during rush hours; $N^{CS}$ is the maximum number of charging stations to be constructed; and $\mu$ is an average service rate of a single device;

the power grid constraints being as follows:

power flow constraints of the power distribution network:

$$\begin{cases} P_{s,i}^L + P_{s,i}^{CS} - P_{s,i}^{DG} = V_{s,i} \sum_{j=1}^n V_{s,j}(G_{ij}\cos\delta_{s,ij} + B_{ij}\sin\delta_{s,ij}) \\ Q_{s,i}^L - Q_{s,i}^{DG} = V_{s,i} \sum_{j=1}^n V_{s,j}(G_{ij}\sin\delta_{s,ij} - B_{ij}\cos\delta_{s,ij}) \end{cases} \forall s \in \Omega_s, \tag{26}$$

$$i \in \Omega$$

scenario chance constraints:

$$Pr\{V^{min} \leq V_{s,i} \leq V^{max}, |P_{s,ij}| \leq P_{ij}^{max}\} = \dfrac{K_s}{96} \geq \gamma \forall i \in \Omega, \forall ij \in \Omega^{Line} \tag{27}$$

DG mounting capacity constraints:

$$\begin{cases} 0 \leq P_{s,j}^{PV} \leq \overline{P}_{s,j}^{PV}, \forall s \in \Omega_s, j \in \Omega^{PV} \\ 0 \leq P_{s,j}^{WG} \leq \overline{P}_{s,j}^{WG}, \forall s \in \Omega_s, j \in \Omega^{WG} \\ \sum_{s \in \Omega_s}(P_{s,j}^{PV} + P_{s,j}^{WG}) \leq \varepsilon \sum_{s \in \Omega_s} \sum_{i=1}^n P_{s,i}^L \end{cases} \tag{28}$$

energy storage capacity and charge-discharge power constraints:

$$\begin{cases} 0 \leq S_k^{BS} \leq S_{max}^{BS}, \\ 0 \leq P_k^{BS} \leq P_{max}^{BS}, \end{cases} \forall k \in \Omega^{BS} \tag{29}$$

in the formulas: $Q_{s,i}^L$ is a reactive load of the node i in the scenario s; $P_{s,t}^{DG}$ and $Q_{s,i}^{DG}$ are DG active and reactive outputs of the node i in the scenario s; $V_{s,j}$ is a voltage amplitude of a node j in the scenario s; $G_{ij}$ and $B_{ij}$ are real part and imaginary part of network admittances respectively; $\delta_{s,ij}$ is a voltage phase angle difference of the nodes i and j in the scenario s; $P_{s,ij}$ and $P_{ij}^{max}$ are a power flowing through a line ij and a power limit; $K_s$ is the number of scenarios meeting chance constraints; $\gamma$ is a confidence coefficient; $\Omega^{Line}$ is a set of power distribution network lines; $\overline{P}_{s,j}^{PV}$ and $\overline{P}_{s,j}^{WG}$ are output upper limits of PV and WG respectively; $\varepsilon$ is a maximum penetration rate of DG access; and $S_k^{BS}$ and $P_k^{BS}$ are a current device capacity and a charge-discharge power of an energy storage node k respectively.

* * * * *